(12) United States Patent
Leblond et al.

(10) Patent No.: US 11,105,682 B2
(45) Date of Patent: Aug. 31, 2021

(54) METHODS AND SYSTEMS FOR IMAGING A SAMPLE USING RAMAN SPECTROSCOPY

(71) Applicant: Polyvalor, Limited Partnership, Montreal (CA)

(72) Inventors: Frederic Leblond, Terrebone (CA); Karl St-Arnaud, Montreal (CA); Francois Daoust, Pointe-Claire (CA)

(*) Notice: Subject to any disclaimer, the term of this patent is extended or adjusted under 35 U.S.C. 154(b) by 0 days.

(21) Appl. No.: 16/647,867

(22) PCT Filed: Sep. 14, 2018

(86) PCT No.: PCT/CA2018/051140
§ 371 (c)(1),
(2) Date: Mar. 16, 2020

(87) PCT Pub. No.: WO2019/051602
PCT Pub. Date: Mar. 21, 2019

(65) Prior Publication Data
US 2020/0284657 A1    Sep. 10, 2020

Related U.S. Application Data

(60) Provisional application No. 62/558,398, filed on Sep. 14, 2017, provisional application No. 62/597,587, filed on Dec. 12, 2017.

(51) Int. Cl.
*G01J 3/44* (2006.01)
*G01J 3/02* (2006.01)
*G01J 3/06* (2006.01)
*G01J 3/28* (2006.01)
*G01N 21/65* (2006.01)

(52) U.S. Cl.
CPC ............ *G01J 3/44* (2013.01); *G01J 3/024* (2013.01); *G01J 3/0208* (2013.01); *G01J 3/0218* (2013.01); *G01J 3/0227* (2013.01); *G01J 3/0289* (2013.01); *G01J 3/06* (2013.01); *G01J 3/2803* (2013.01); *G01N 21/65* (2013.01); *G01J 2003/064* (2013.01)

(58) Field of Classification Search
CPC ........ G01J 3/44; G01J 3/02; G01J 3/06; G01J 3/28; G01J 2003/064; G01J 3/32; G01N 21/65; G01N 21/64; G01N 2021/656; G01N 2201/08
See application file for complete search history.

(56) References Cited

U.S. PATENT DOCUMENTS

| | | | | |
|---|---|---|---|---|
| 5,615,673 A | * | 4/1997 | Berger | A61B 5/14532 356/301 |
| 5,715,345 A | * | 2/1998 | McKinley | G02B 6/04 250/227.2 |
| 2003/0227628 A1 | * | 12/2003 | Kreimer | G01N 21/6428 356/419 |

* cited by examiner

*Primary Examiner* — Abdullahi Nur
(74) *Attorney, Agent, or Firm* — JD Patent & Trademark Ltd.; Julian Forman

(57) ABSTRACT

A system and method for imaging a sample using Raman spectrometry. Optical fibers having opposite first ends and second ends are arranged with the first ends and second ends in respective two-dimensional arrays. The two-dimensional arrays maintain relative positions of the optical fibers to one another from the first ends to the second ends in a way that the first end of each optical fibers of the bundle can simultaneously collect a corresponding Raman signal portion scattered from specific spatial coordinates of the area of the sample. The so-collected Raman signal portions are propagated towards the corresponding second end, from which are outputted and detected simultaneously using an array of detectors.

12 Claims, 17 Drawing Sheets

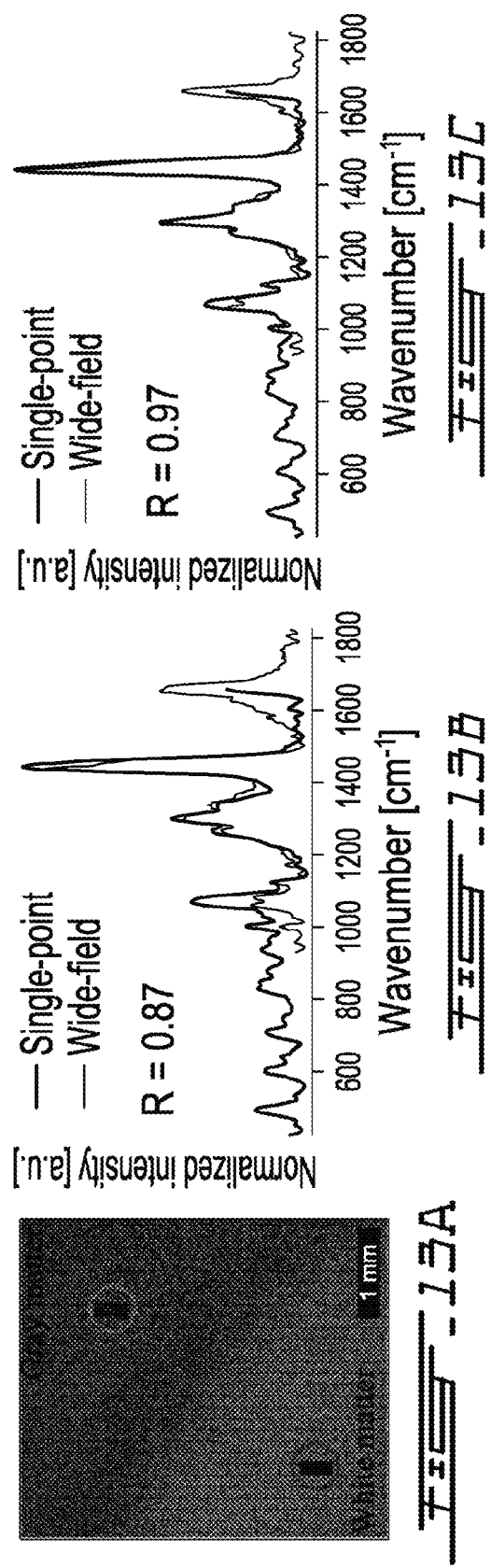
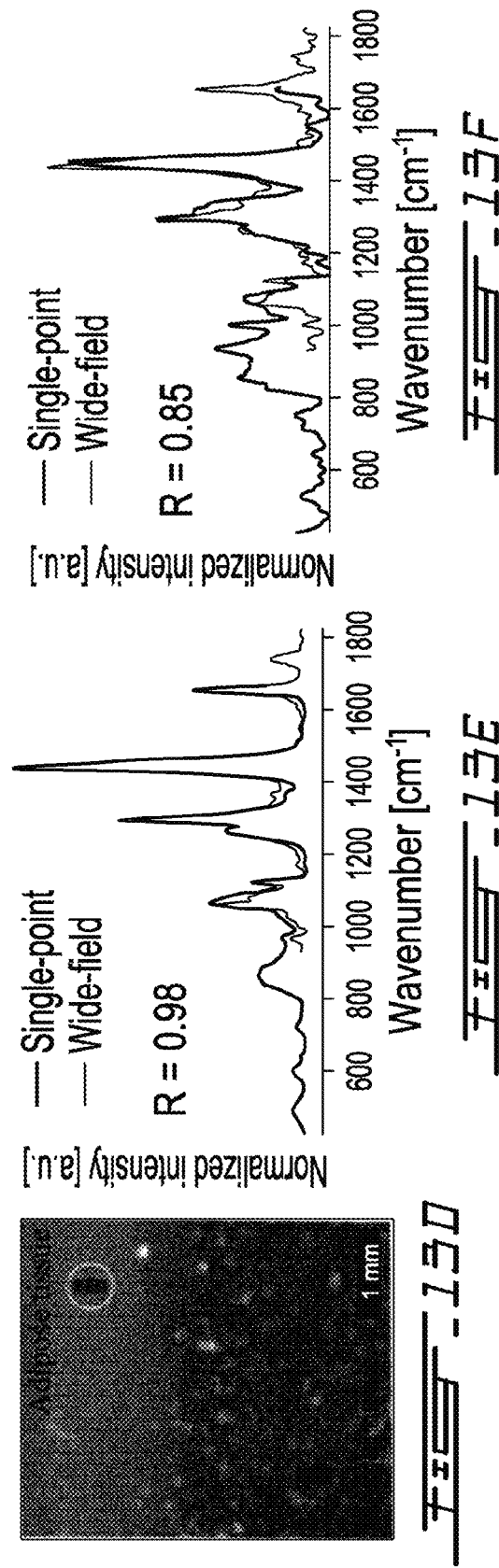

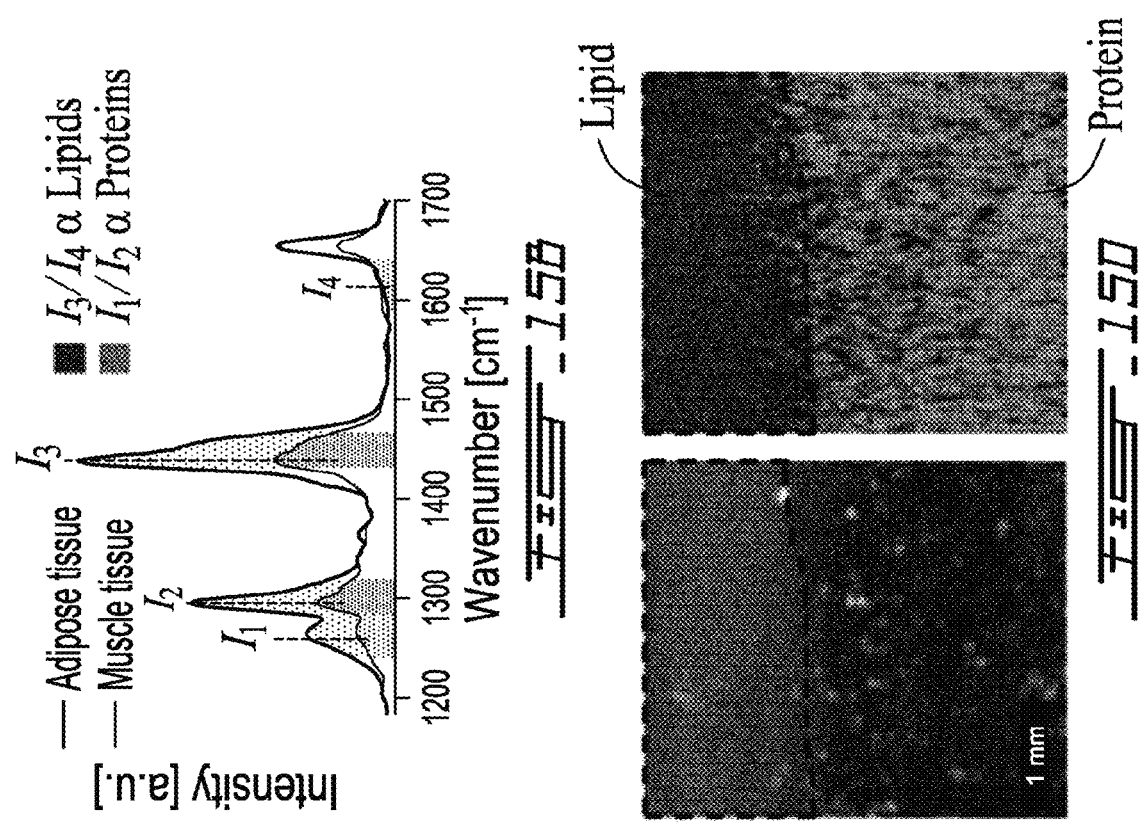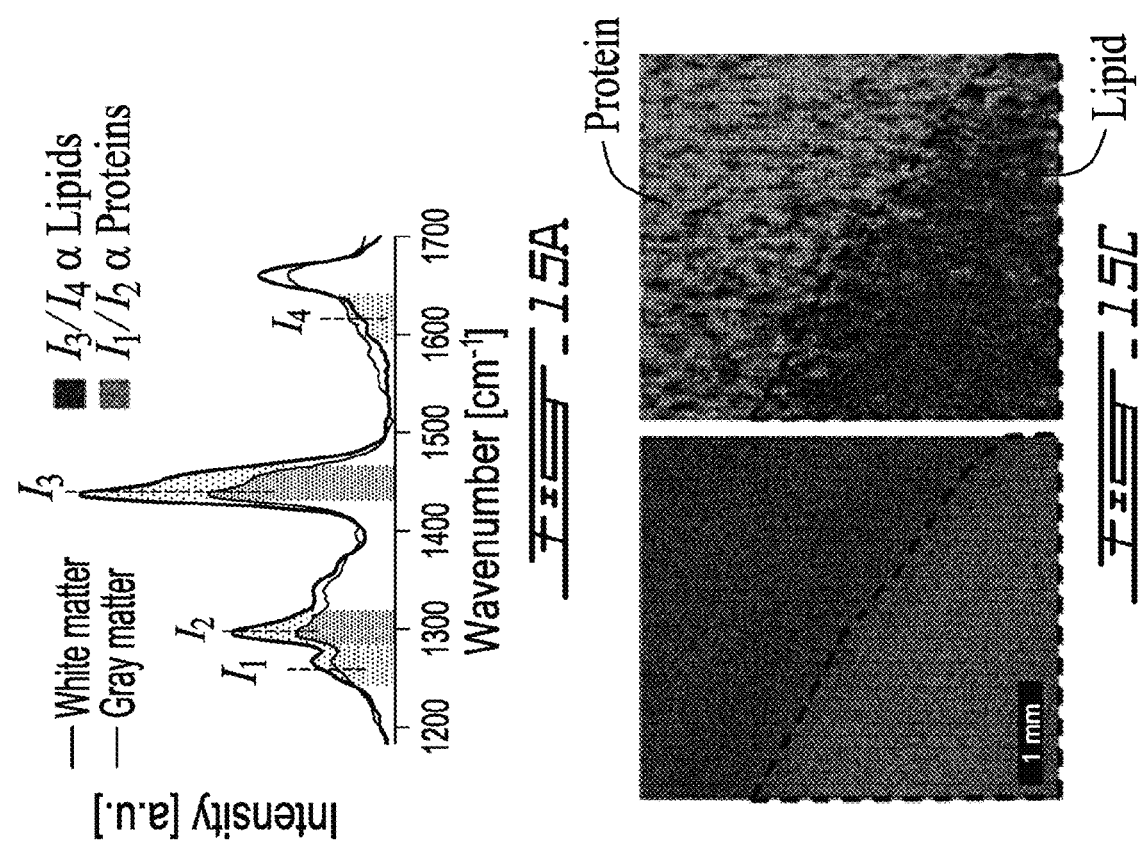

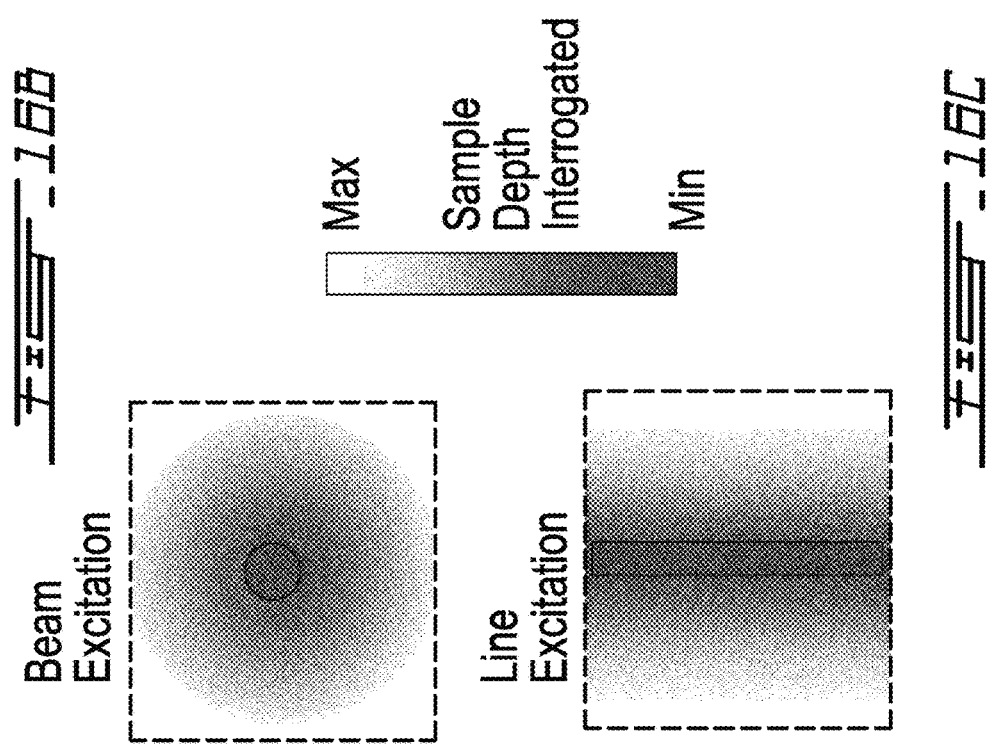
FIG. 16B
FIG. 16C
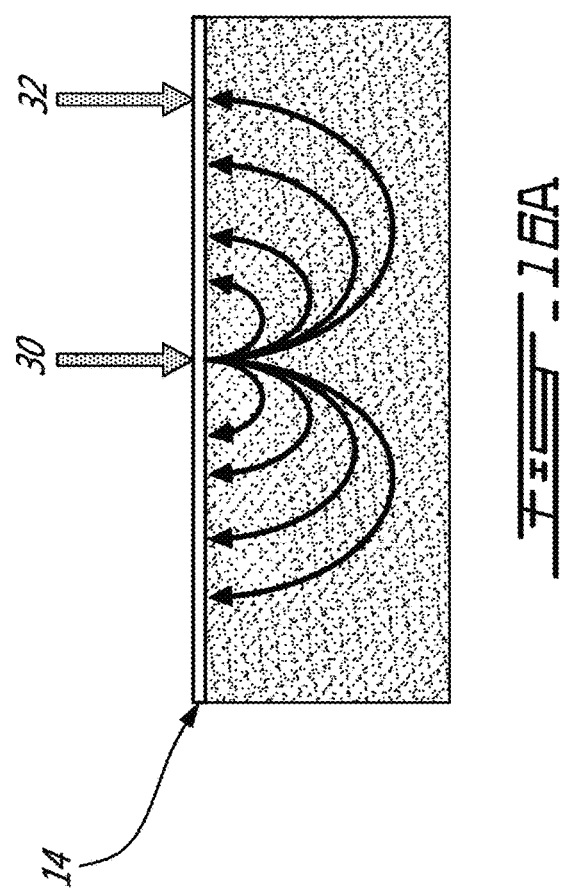
FIG. 16A

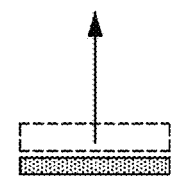
Spatially Offset Line Scanning
FIG. 17A
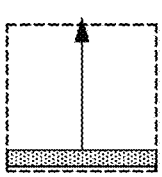
Full image
FIG. 17B
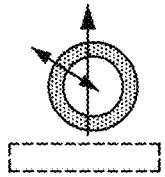
Line Scanning
FIG. 18A
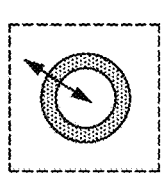
Full image
FIG. 19B
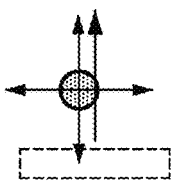
Line Scanning
FIG. 18A
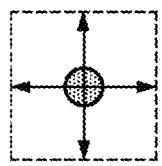
Full image
FIG. 18B
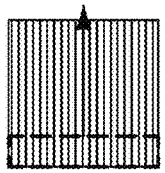
Line Scanning
FIG. 20A
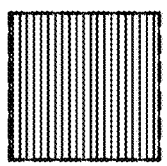
Full image
FIG. 20B

METHODS AND SYSTEMS FOR IMAGING A SAMPLE USING RAMAN SPECTROSCOPY

REFERENCE TO RELATED APPLICATIONS

This is a U.S. National Stage of International Application PCT/CA2018/051140, filed Sep. 14, 2018.

This patent application claims priority of U.S. Provisional Patent Application Ser. No. 62/558,398 filed Sep. 14, 2017, and of U.S. Provisional Patent Application Ser. No. 62/597,587, the contents of both of which is hereby incorporated by reference.

FIELD

The improvements generally relate to the field of Raman spectroscopy, and more particularly relates to the field of Raman spectroscopic imaging using an optical probe having a bundle of optical fibers.

BACKGROUND

Raman spectroscopy is a spectroscopic technique which can be used to characterize atoms or molecules of a sample. In this technique, the sample is illuminated with an excitation beam, generally comprising monochromatic photons, which excites vibrational, rotational, and/or other low-frequency modes of the atoms or molecules of the sample in a manner which causes them to scatter photons having a different energy level than those of the incident monochromatic photons. The shift(s) in the energy level between the incident photons and the scattered photos gives signature information which can be used to characterize the atoms or molecules of the sample.

It is known that Raman spectroscopy can be used in various fields such as oncology to determine whether a sample contains healthy cells or cancerous cells, based on the respective signature information of such cells. In these fields, optical probes can be used to interrogate a point of the sample, and collect the Raman signal therefrom to determine whether, at that point, the sample contains healthy cells or cancerous cells, a technique often referred to as "single-point Raman spectroscopy". To obtain information concerning an area of the sample, the optical probe is manipulated to interrogate, sequentially, many points of the area of the sample.

Although existing optical probes for Raman spectroscopy have been satisfactory to a certain degree, there remains room for improvement.

SUMMARY

According to one aspect, there is described a method and system for imaging an area of a sample using Raman spectroscopy. The method and system can involve the use of a bundle of optical fibers in the excitation/illumination of the sample, in the collection of Raman signal from the sample, or both.

In one aspect, the optical fibers have opposite first ends and second ends, and are arranged with the first ends and the second ends in respective two-dimensional arrays. As explained below, the two-dimensional arrays maintain relative positions of the optical fibers to one another from the first ends to the second ends. In this way, the first end of each optical fibers of the bundle can simultaneously collect a corresponding Raman signal portion scattered from specific spatial coordinates of the area of the sample. The so-collected Raman signal portions are propagated toward the corresponding second end, from which it is outputted, and detected simultaneously using an array of detectors.

It was found that by using a bundle of optical fibers which maintains the relative positions of the optical fibers, the bundle of optical fiber can relay the Raman signal portions incoming from the entire area, from the first ends to the seconds ends, without losing spatial information, and thus allows the array of detectors to generate image data indicative of the intensity of the Raman signal as function of spatial coordinates of the whole area of the sample at once.

In another aspect, it was found convenient to use an objective optically coupled to the first ends of the optical fibers of the bundle. More specifically, the objective used has a numerical aperture below 0.4, preferably below 0.3 and most preferably of 0.2 to reach a larger field of view more easily with an imaged area of the sample which exceeds 1 $mm^2$.

To arrive with such an improvement, the inventors had to overcome a generally accepted paradigm existing in the field of Raman spectroscopy. Indeed, the paradigm dictated that a Raman spectroscopy imaging system should aim at obtaining the greatest spatial resolution possible. One way to increase the resolution is to used objective with large numerical aperture which was generally found convenient to collect more Raman signal due to the greater angle of the cone of light acceptance. However, the inventors understood that, in some situations, the spatial resolution was less relevant than the field of view of the Raman spectroscopy imaging system. Accordingly, the inventors went against what was generally accepted in the field an objective with a numerical aperture below 0.4, which increased the field of view while reducing the spatial resolution. By proceeding accordingly, it was found that even if the numerical aperture was reduced, contrary to what would have been intuitive in the field, the resulting Raman spectroscopy imaging system would nonetheless collect sufficient Raman signal to obtain a satisfactory spatial resolution due to the collection of Raman signal over a larger area cause by the loss of spatial resolution.

Additionally or alternately, the paradigm dictated that a Raman spectroscopy imaging system should aim at maximizing the collected Raman signal. One way to increase the resolution is to use an objective with large numerical aperture to collect light with a greater cone of acceptance, which was generally found convenient to obtain the greatest spatial resolution. However, the inventors understood that, in some situations, the numerical aperture could be reduced to achieve imaging capability over a larger field of view. Accordingly, the inventors went against what was generally accepted in the field and used an objective with a numerical aperture below 0.4, which allowed to reach more easily larger field of view, but reduced the spatial resolution. By proceeding accordingly, it was found that even if the numerical aperture was reduced, the lower spatial resolution lead to discretization of Raman image over larger area which can partially compensate the loss of signal caused by the reduction of the numerical aperture. Contrary to what would have been intuitive in the field, the resulting Raman spectroscopy imaging system would nonetheless collect sufficient Raman signal to obtain a satisfactory spatial resolution due to the collection of Raman signal over a larger area cause by the loss of spatial resolution.

In another aspect, it was found convenient to use a bundle of optical fibers having a two-dimensional array of the first ends of the optical fibers having a height and a width both exceeding 1 mm, preferably exceeding 2 mm, and most preferably of 4 mm, providing a field of view of said area of said sample exceeding 1 mm², for instance, while keeping a spatial resolution of about 100 µm.

To come up with such an improvement, the inventors had to overcome another generally accepted paradigm existing in the field of Raman spectroscopy. Indeed, this paradigm dictated that a Raman spectroscopy imaging system should aim at obtaining the greatest spatial resolution possible. Using a bundle of fibers, the resolution is usually limited by the number of fibers that cover the field of view. Therefore, a larger field of view can lead to a reduced spatial resolution for the same number of fibers. Accordingly, the inventors increased the height and width of the two-dimensional array of the first ends of the optical fibers, which increased the field of view, for instance, while preserving a spatial resolution of about 100 µm.

In accordance with one aspect, there is provided a method for imaging a sample using Raman spectroscopy, the method comprising: illuminating an area of said sample with an excitation beam, spatial coordinates of said area emitting, in response to said illuminating, corresponding Raman signal portions each having corresponding spectral components; collecting said Raman signal portions using first ends of a plurality of optical fibers extending between said first ends and second ends, said first ends and said second ends of said plurality of optical fibers being arranged in a respective one of two two-dimensional arrays, said two two-dimensional arrays maintaining relative positions of said plurality of optical fibers to one another from said first ends to said second ends in a manner that said collected Raman signal portions are propagated along the plurality of optical fibers while maintaining said relative positions from said first ends towards said second ends, from which said Raman signal portions are outputted; receiving and directing at least some of said Raman signal portions signal outputted from said second ends of said plurality of optical fibers onto an array of detectors; and said array of detectors generating image data indicative of an intensity of said Raman signal portions as function of said spatial coordinates of said area and as function of said spectral components of said Raman signal portions.

In accordance with another aspect, there is provided a system for imaging a sample using Raman spectroscopy, the system comprising: an excitation assembly configured to illuminate an area of said sample with an excitation beam, spatial coordinates of said area emitting, in response to said illumination, corresponding Raman signal portions each having corresponding spectral components; a collection assembly comprising a plurality of optical fibers extending between first ends and second ends, said first ends and said second ends of said plurality of optical fibers being arranged in a respective one of two two-dimensional arrays, said first ends being positionable to collect said Raman signal portions from said area of said sample, said two two-dimensional arrays maintaining relative positions of said plurality of optical fibers to one another from said first ends to said second ends in a manner that said collected Raman signal portions are propagated along the plurality of optical fibers while maintaining said relative positions from said first ends towards said second ends, from which said Raman signal portions are outputted; a scanning assembly configured to receive and image at least some of said Raman signal portions signal outputted from said second ends of said plurality of optical fibers onto a focal plane; and an array of detectors at the focal plane positioned to receive said Raman signal portions from said scanning assembly and to generate image data indicative of an intensity of said Raman signal portions as function of said spatial coordinates of said area and as function of said spectral components of said Raman signal portions.

In accordance with another aspect, there is provided a method for imaging a sample using Raman spectroscopy, the method comprising: illuminating an area of said sample with an excitation beam, spatial coordinates of said area emitting, in response to said illuminating, corresponding Raman signal portions each having corresponding spectral components; collecting said Raman signal portions using first ends of a plurality of optical fibers extending between said first ends and second ends, said first ends and said second ends of said plurality of optical fibers being arranged in a respective one of two two-dimensional arrays, said collected Raman signal portions propagating along said plurality of optical fibers from said first ends towards said second ends, from which said Raman signal portions are outputted; receiving said outputted Raman signal portions and focussing said received Raman signal portions to form a focussed beam including at least some of said Raman signal portions; receiving said focussed beam and directing a portion of said focussed beam towards an entry slit of an imaging spectrometer, said entry slit leading to an array of detector, said portion of said focussed beam including Raman signal portions corresponding to a region of said spatial coordinates of said area of said sample; said array of detectors generating image data indicative of an intensity of said Raman signal portions as function of said spatial coordinates of said region and as function of said spectral components of said Raman signal portions; and repeating said receiving said focussed beam, said directing and said generating for remaining portions of said focussed beam, by moving said focussed beam relative to said entry slit, said remaining portions corresponding to remaining regions of said spatial coordinates of said area of said sample.

In accordance with another aspect, there is provided a system for imaging a sample using Raman spectroscopy, the system comprising: an excitation assembly configured to illuminate an area of said sample with an excitation beam, spatial coordinates of said area emitting, in response to said illumination, corresponding Raman signal portions each having corresponding spectral components; a collection assembly comprising a plurality of optical fibers extending between first ends and second ends, said first ends and said second ends of said plurality of optical fibers being arranged in a respective one of two two-dimensional arrays, said first ends being positionable to collect said Raman signal portions from said area of said sample, said collected Raman signal portions propagating along said plurality of optical fibers from said first ends towards said second ends, from which said Raman signal portions are outputted; a spatial scanning assembly comprising an objective assembly and a scanning mirror assembly, said objective assembly being configured to receive said outputted Raman signal portions and to focus said received Raman signal portions to form a focussed beam including at least some of said Raman signal portions, said scanning mirror assembly being configured to receive said focussed beam and to direct a portion of said focussed beam towards an entry slit, said portion of said focussed beam including Raman signal portions corresponding to a region of said spatial coordinates of said area of said sample; an imaging spectrometer comprising said entry slit and an array of detectors to which the entry slit leads, said array of detectors generating image data indicative of an intensity of said portion of said focussed beam as function of said spatial coordinates of said region and as function of said spectral components of said Raman signal portions; and said scanning mirror assembly being configured to move said focussed beam relative to said entry slit, to generate image data associated to said remaining portions corresponding to remaining regions of said spatial coordinates of said area of said sample.

In accordance with another aspect, there is provided a method for imaging a sample using Raman spectroscopy, the method comprising: illuminating an area of said sample with an excitation beam, spatial coordinates of said area emitting, in response to said illuminating, corresponding Raman signal portions; collecting said Raman signal portions using first ends of a plurality of optical fibers extending between said first ends and second ends, said first ends and said second ends of said plurality of optical fibers being arranged in a respective one of two two-dimensional arrays, said two two-dimensional arrays maintaining relative positions of said plurality of optical fibers to one another from said first ends to said second ends in a manner that said collected Raman signal portions are propagated along the plurality of optical fibers while maintaining said relative positions from said first ends towards said second ends, from which said Raman signal portions are outputted; receiving and directing at least some of said Raman signal portions signal outputted from said second ends of said plurality of optical fibers onto an array of detectors; and said array of detectors generating image data indicative of an intensity of said Raman signal portions as function of said spatial coordinates of said area.

In accordance with another aspect, there is provided a method for imaging a sample, the method comprising: illuminating an area of said sample with an excitation beam, spatial coordinates of said area emitting, in response to said illuminating, corresponding signal portions each having corresponding spectral components; collecting said signal portions using first ends of a plurality of optical fibers extending between said first ends and second ends, said first ends and said second ends of said plurality of optical fibers being arranged in a respective one of two two-dimensional arrays, said two two-dimensional arrays maintaining relative positions of said plurality of optical fibers to one another from said first ends to said second ends in a manner that said collected signal portions are propagated along the plurality of optical fibers while maintaining said relative positions from said first ends towards said second ends, from which said signal portions are outputted; receiving and directing at least some of said signal portions signal outputted from said second ends of said plurality of optical fibers onto an array of detectors; and said array of detectors generating image data indicative of an intensity of said signal portions as function of said spatial coordinates of said area and as function of said spectral components of said signal portions.

In this aspect, the inventors found that by directing a focussed beam of the Raman signal portions directly onto the entry slit using the scanning mirror assembly, the entry slit could act as an aperture for some of the Raman signal portions, and allows a selection of which Raman signal portions to image on the slit. Contrary to conventional line-scanning apparatuses, such a configuration can reduce optical losses and vignetting effects. Indeed, such conventional line-scanning apparatuses generally involve collimating a beam using a first set of lenses and redirecting a collimating beam using the scanning mirror assembly, and then focussing the redirected beam using a second set of lenses having a fixed position between the scanning mirror assembly and the entry slit. Such conventional setups may require more lenses to collimate the output of the bundle and refocus it onto the entrance which may, in turn, result in more optical loss in transmission caused by each of the lenses. In addition, the distance between the first and second sets of lenses is constraint by addition of the scanning apparatuses which can result in vignetting effect.

In accordance with another aspect, there is provided a method for imaging a sample using Raman spectroscopy, the method comprising: illuminating an area of said sample with an illumination pattern having an uneven intensity across said area, with an excitation beam, including conveying the illumination pattern with a plurality of optical fibers arranged in a two-dimensional array; said sample emitting, in response to said illuminating, corresponding Raman signal portions each having corresponding spectral components; collecting and directing at least some of said Raman signal portions onto an array of detectors; and said array of detectors generating image data indicative of an intensity of said Raman signal portions as function of said spatial coordinates of said area and as function of said spectral components of said Raman signal portions.

In accordance with still another aspect, there is provided a method for illuminating a sample, the method comprising: illuminating an area of said sample with an illumination pattern having an uneven intensity across said area, with an excitation beam, including conveying the illumination pattern with a plurality of optical fibers arranged in a two-dimensional array; the pattern including at least one illuminated area and at least one non-illuminated area adjacent the at least one illuminated area, changing the size, shape, and/or position of the at least one illuminated area and of the at least one non-illuminated area adjacent the at least one illuminated area over time, including changing the intensity distribution in the two dimensional array of optical fibers.

It will be understood that the expression 'computer' as used herein is not to be interpreted in a limiting manner. It is rather used in a broad sense to generally refer to the combination of some form of one or more processing units and some form of memory system accessible by the processing unit(s). Similarly, the expression 'controller' as used herein is not to be interpreted in a limiting manner but rather in a general sense of a device, or of a system having more than one device, performing the function(s) of controlling one or more device such as an electronic device or an actuator for instance.

It will be understood that the various functions of a computer or of a controller can be performed by hardware or by a combination of both hardware and software. For example, hardware can include logic gates included as part of a silicon chip of the processor. Software can be in the form of data such as computer-readable instructions stored in the memory system. With respect to a computer, a controller, a processing unit, or a processor chip, the expression "configured to" relates to the presence of hardware or a combination of hardware and software which is operable to perform the associated functions.

Many further features and combinations thereof concerning the present improvements will appear to those skilled in the art following a reading of the instant disclosure.

DESCRIPTION OF THE FIGURES

In the figures,

FIG. 13A is a white light image of a calf brain sample showing an area where a
Raman signal was acquired;

FIG. 13B is a graph comparing intensities as function of Raman shift when interrogating gray matter of the calf brain sample of FIG. 13A with a single-point optical probe and with the system of FIG. 8;

FIG. 13C is a graph comparing intensities as function of Raman shift when interrogating white matter of the calf brain sample of FIG. 13A with a single-point optical probe and with the system of FIG. 11;

FIG. 13D is a white light image of porcine meat sample showing an area where a Raman signal was acquired;

FIG. 13E is a graph comparing intensities as function of Raman shift when interrogating an adipose tissue of the porcine meat sample of FIG. 13D with a single-point optical probe and with the system of FIG. 8;

FIG. 13F is a graph comparing intensities as function of Raman shift when interrogating a muscle tissue of the porcine meat sample of FIG. 13D with a single-point optical probe and with the system of FIG. 8;

FIG. 15A is a graph showing intensity as function of Raman shift showing peaks and spectral regions used to compute ratios associated to lipids and proteins for white matter and gray matter of a calf brain sample;

FIG. 15B is a graph showing intensity as function of Raman shift showing peaks and spectral regions used to compute ratios associated to lipids and proteins for adipose tissue and muscle tissue of a porcine meat sample;

FIG. 15C includes reconstructed molecular images of the calf brain sample;

FIG. 15D includes reconstructed molecular images of the porcine meat sample;

FIGS. 16A, 16B, and 16C schematize the principle of spatially offset Raman spectroscopy, with 16A being a cross-sectional view showing the penetration of the signal in the sample, and FIGS. 16B and 16C being top plan views, with FIG. 16B showing a circular illumination pattern, and 16C showing a line illumination pattern;

FIGS. 17A and 17B schematize Raman spectroscopy using line excitation with spatially offset line scanning, and fixed imaging, respectively;

FIGS. 18A and 18B schematize Raman spectroscopy using spot excitation with spatially offset line scanning, and fixed imaging, respectively;

FIGS. 19A and 19B schematize Raman spectroscopy using annular excitation with spatially offset line scanning, and fixed imaging, respectively;

FIGS. 20A and 20B schematize Raman spectroscopy using spatially repeating pattern with spatially line scanning, and fixed imaging, respectively.

DETAILED DESCRIPTION

Figure 1:
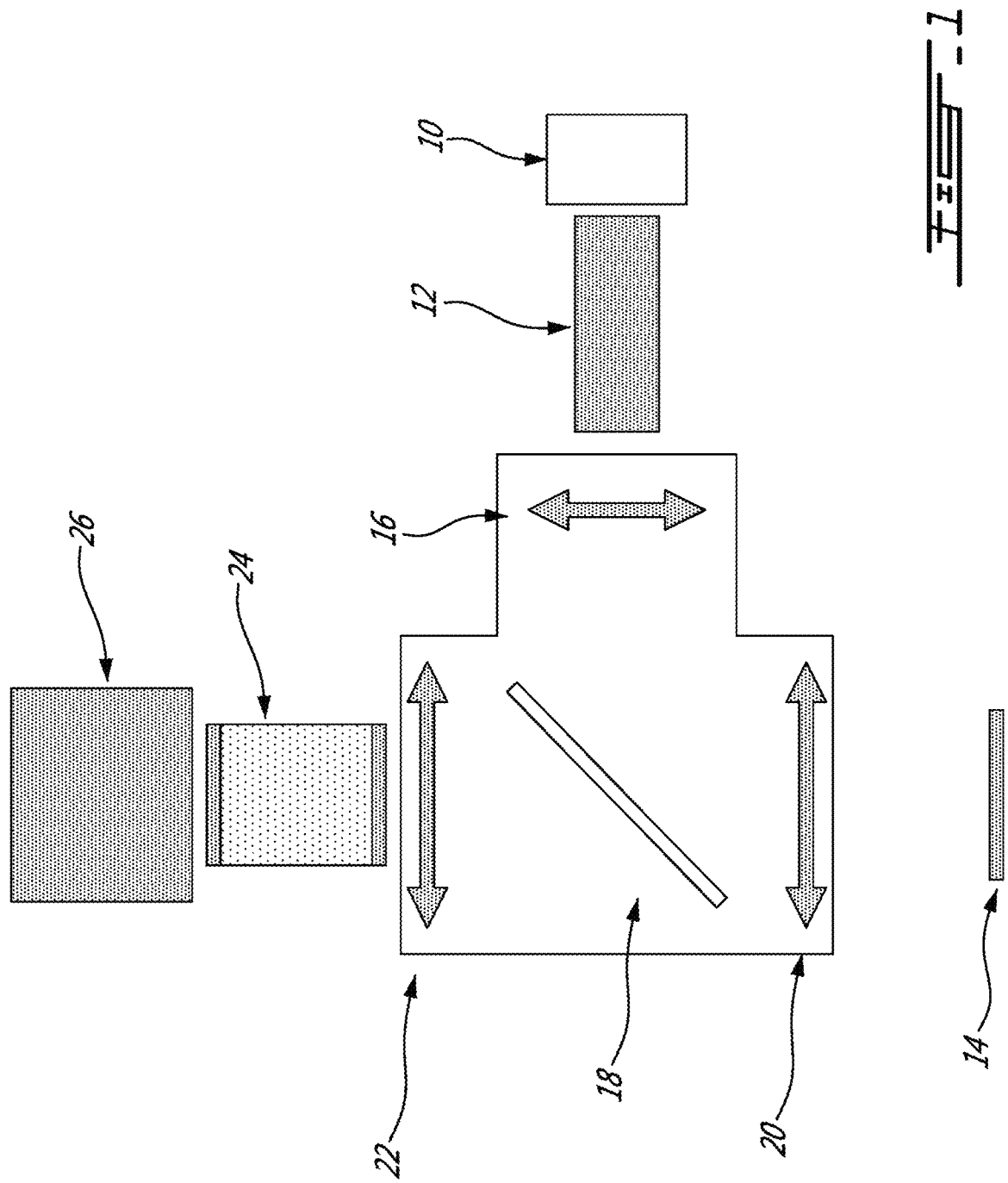
FIG. 1 is a schematic view of an example of a system for imaging a sample using Raman spectroscopy having a bundle of optical fibers used for collection of the Raman signal, in accordance with an embodiment.
Figure 2:
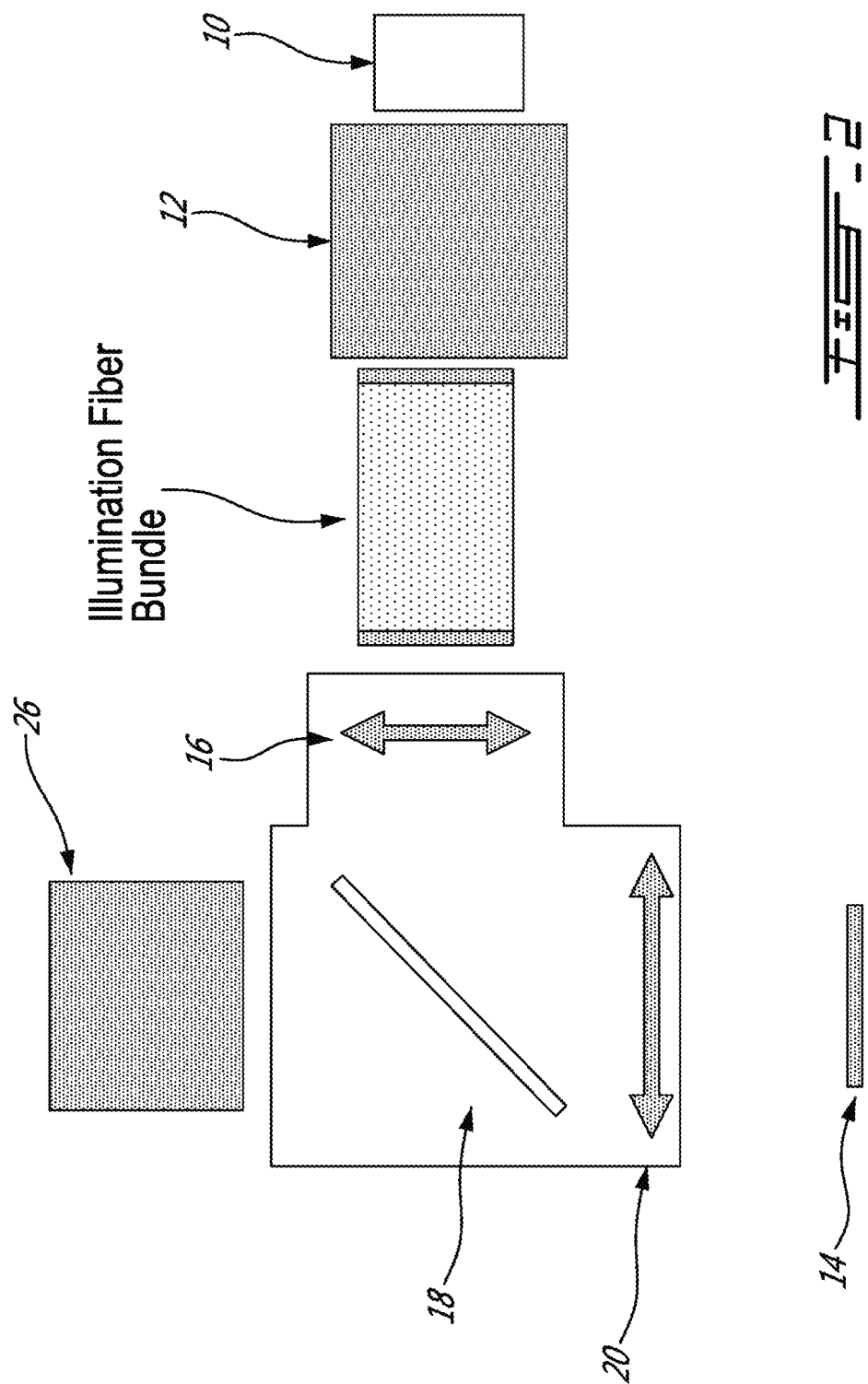
FIG. 2 is a schematic view of an example of a system for imaging a sample using Raman spectroscopy having a bundle of optical fibers used for illumination of the sample, in accordance with an embodiment.
Figure 3:
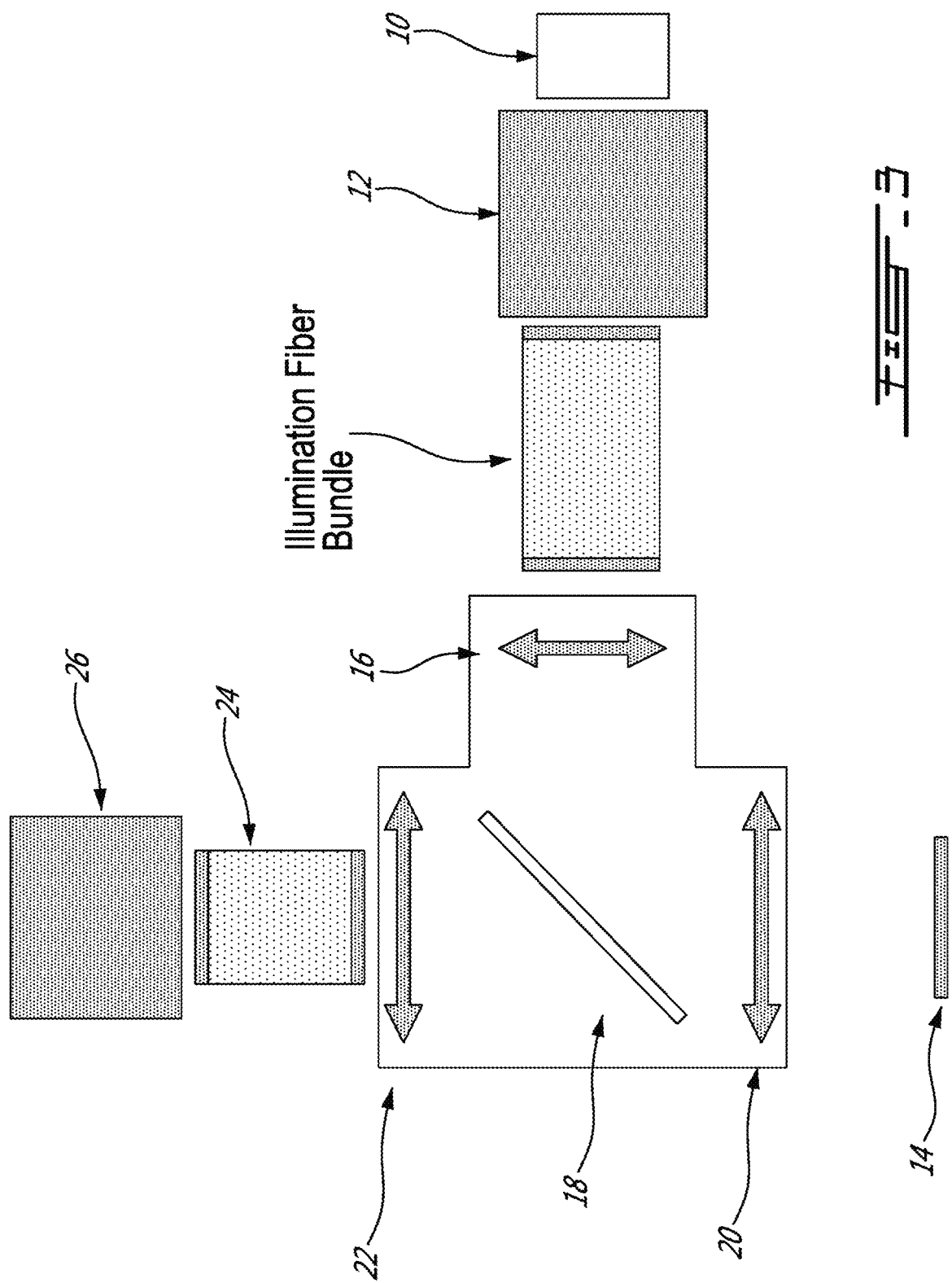
FIG. 3 is a schematic view of an example of a system for imaging a sample using Raman spectroscopy having a bundle of optical fibers used both for collection of the Raman signal and for illumination of the sample, in accordance with an embodiment.

FIG. 1 shows an example of a system for imaging a sample using Raman spectroscopy. In the system of FIG. 1, a bundle of optical fibers is used for collection of the Raman signal. It will be noted, as shown in FIG. 2, that a system can alternately use a bundle of optical fibers for illumination, or, such as shown in FIG. 3, that a system can use a bundle of optical fibers both for illumination and collection. The case of the use of optical fibers in collection of the Raman signal will be discussed first, and we will then turn to the cases of using the bundle of optical fibers for illumination, or both for illumination and collection.

As shown in FIG. 1, the system includes a laser 10, and illumination optics 12 leading to the sample 14 via an assembly including a collimating lens 16, a dichroic notch filter 18 and a focus lens 20. The Raman signal is collected via the focus lens 20, the dichroic notch filter 18, focus lens 22, a bundle of optical fibers 24, and collection optics and sensors 26. This arrangement is one of many possible arrangements. In alternate embodiments, for instance, the dichroic notch filter 18 may be omitted, with the illumination and collection optics assemblies being positioned side by side, for instance.

Figure 4:
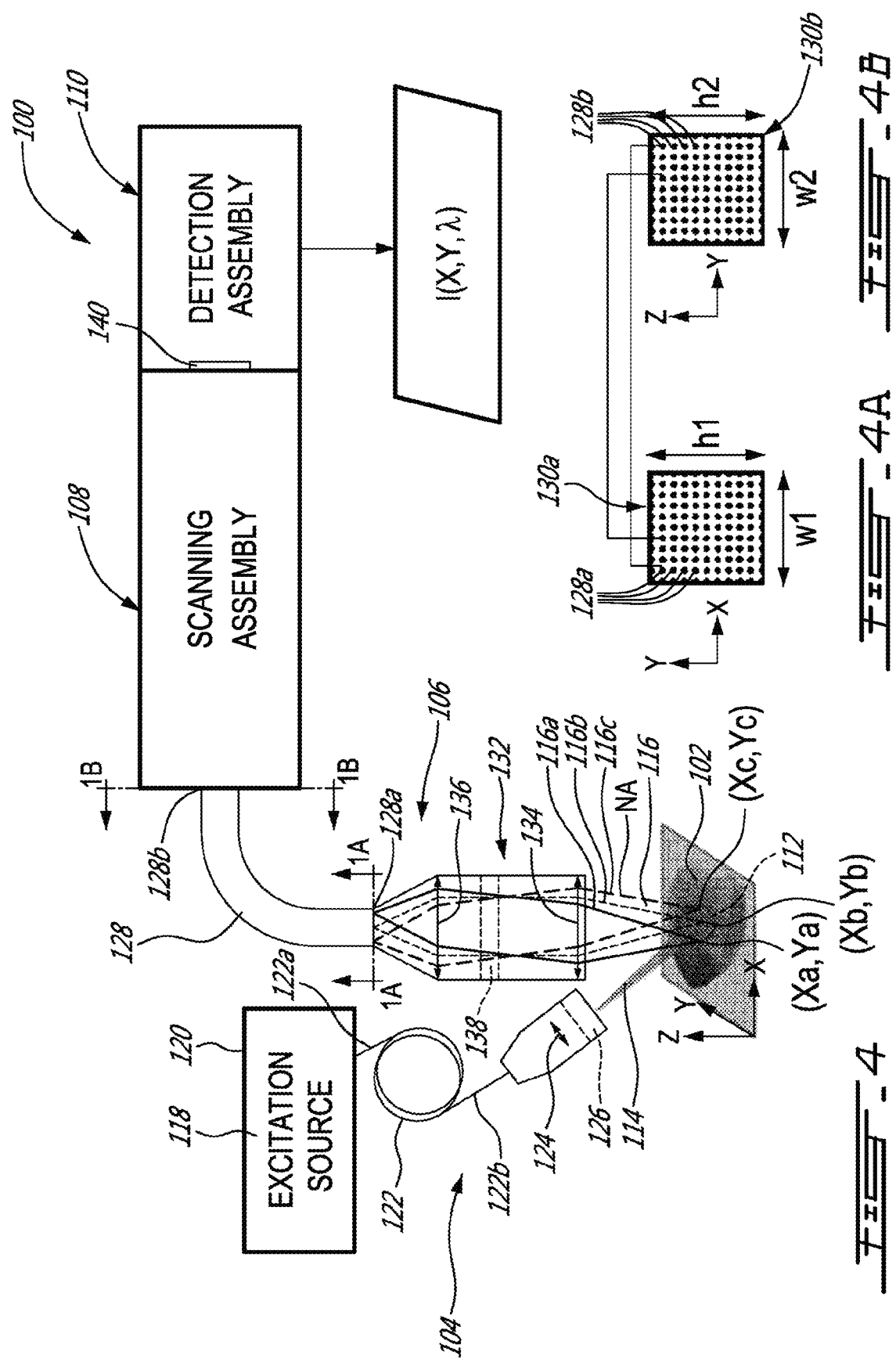
FIG. 4 is a schematic view of an example of a system for imaging a sample using Raman spectroscopy, shown with a bundle of optical fibers, in accordance with an embodiment.

FIG. 4 shows another example of a system 100 for imaging a sample 102 using Raman spectroscopy. As depicted, the system 100 has an excitation assembly 104, a collection assembly 106, a scanning assembly 108 and a detection assembly 110.

In this example, the excitation assembly 104 is configured to illuminate an area 112 of the sample 102 with an excitation beam 114. As can be understood, in response to such an illumination, atoms or molecules located at spatial coordinates (X, Y) of the area 112 emit corresponding Raman signal portions 116 each having corresponding spectral components. As illustrated, for instance, one region (Xa, Ya) of the illuminated area may emit a first Raman signal portion 116a, whereas other regions (Xb, Yb) and (Xc, Yc) of the illuminated area may emit a respective one of a second Raman signal portion 116b and a third Raman signal portion 116c.

In this specific embodiment, the excitation assembly 104 has an excitation source 118 provided in the form of a fiber laser source 120 having a beam delivery cable 122. The beam delivery cable 122 has a proximal end 122a optically coupled to the fiber laser source 120, and a distal end 122b where the excitation beam 114 is outputted. As shown, the distal end 122b of the beam delivery cable 122 is optically coupled to one or more optical elements, e.g., a converging lens 124, for illuminating the desired area 112 of the sample 102. However, it will be understood that, in some other embodiments, the excitation source 118 can be provided in the form of a free space laser source, or any other suitable monochromatic excitation source. Also shown in this example, the excitation assembly 104 can have an optical notch filter 126 allowing the outputted excitation beam 114 to have a narrow excitation wavelength band Δλe.

The collection assembly 106 shown in this example has a bundle (or a plurality) of optical fibers 128 which extend from first ends 128a to second ends 128b. Both the first ends 128a and the second ends 128b of the bundle of optical fibers 128 are arranged in a respective one of two two-dimensional arrays 130a and 130b, as shown in FIGS. 4A and 4B, respectively. As can be understood, the two two-dimensional arrays 130a and 130b maintain relative positions of the optical fibers 128 to one another from the first ends 128a to the second ends 128b. In this way, a Raman signal portion emitted from specific spatial coordinates (Xi, Yi) of the illuminated area 112 of the sample 102 can be collected at one or more of the first ends 128a of the optical fibers 128, propagated along the corresponding optical fiber(s) 128, while maintaining its relative position in the bundle, and then outputted at corresponding one or more of the second ends 128b for later detection.

In this specific embodiment, the collection assembly 106 has imaging optics 132 for imaging the area 112 of the sample 102 onto the two-dimensional array 130a of the first ends 128a of the optical fibers 128. As shown in this example, the imaging optics 132 includes an objective 134 for collecting the Raman signal portions, which is optically coupled to one or more optical elements, e.g., a converging lens 136, for focusing the incoming Raman signal portions onto the two-dimensional array 130a of the first ends 128a of the optical fibers 128.

For the reasons mentioned above, it was found convenient to select an objective 134 having a numerical aperture below 0.4, preferably below 0.3 and most preferably of 0.2, for reducing the cone of acceptance at which Raman signal portions can be received. By using objectives 134 having such low numerical aperture, the field of view of the collection assembly can be conveniently exceed 1 mm$^2$ while still providing a satisfactory spatial resolution.

For the reasons mentioned above, it was found convenient to select the two-dimensional array 130a of the first ends 128a of the optical fibers 128 to have a width w1 and a height h1 both exceeding 1 mm, preferably exceeding 2 mm and most preferably of 4 mm, to increase the field of view exceeding 1 mm$^2$ while still providing a satisfactory spatial resolution.

Depending of the embodiments, the numerical aperture of the objective 134 and the dimensions w1 and h1 of the two-dimensional array 130a of the first ends 128a of the optical fibers 128, the field of view of the collection assembly 106 can exceed 10 mm$^2$ in some embodiments, and can even exceed 25 mm$^2$ in some other embodiments.

It is known that the illuminated atoms or molecules of the sample 102 will also scatter photons having the same energy level than that of the incident monochromatic photons, which is known as Rayleigh scattering. As Rayleigh scattering is typically strong relative to Raman scattering, challenges exist in discriminating the Rayleigh scattering in favor of the Raman scattering. To do so, the collection assembly can include one or more notch filter 138 to filter out the narrow excitation wavelength band Δλe of the excitation beam 114, to avoid detection of Rayleigh scattering to the benefit of the Raman scattering.

Once outputted at the second ends 128b of the optical fibers 128, the scanning assembly 108 receives the Raman signal portions 116 and direct them towards the detection assembly 110, and more specifically, towards an array of detectors 140 of the detection assembly 110. As can be understood, the array of detectors 140 is configured to generate image data indicative of an intensity of the Raman signal portion as function of the corresponding spatial coordinates (X, Y) of the area 112 of the sample 102 and as function of the spectral components A of the corresponding Raman signal portion. In other words, the image data are indicative of the intensity I as function of the spatial coordinates (X, Y) and as function of the wavelength λ of the Raman signal portion at such spatial coordinates (X, Y), i.e. I(X, Y, λ). In some embodiments, the array of detectors 140 provides raw data which are then processed using a computer to obtain processed image data I(X, Y, λ).

Figure 5:
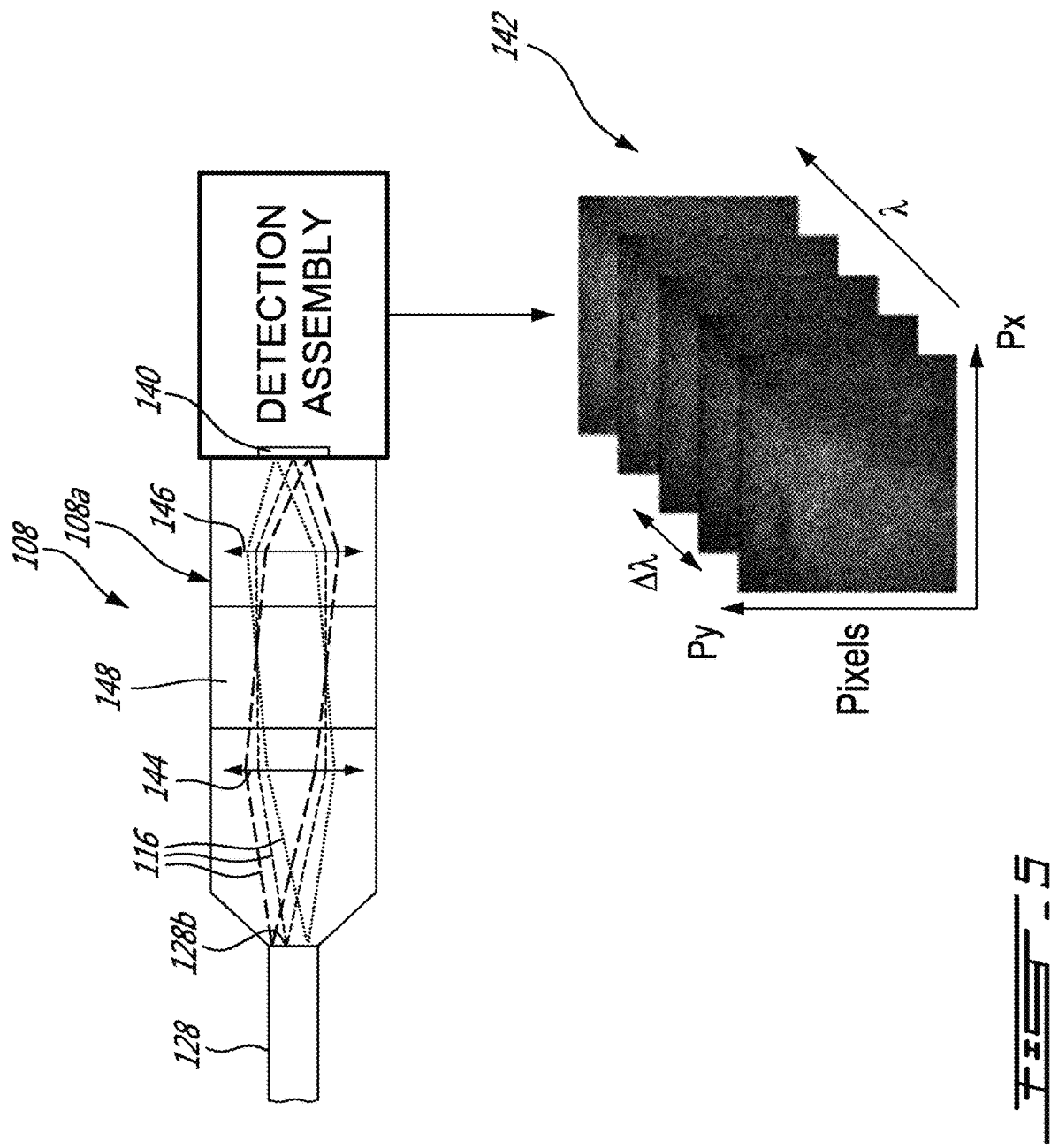
FIG. 5 is a schematic view of an example of a spectral scanning assembly of the system of FIG. 4, in accordance with an embodiment.

Referring now to the embodiment of FIG. 5, the scanning device 108 can be configured in the form of a spectral scanning device 108a to provide raw data which can be processed to provide images 142a indicative of the intensity I(X, Y) for a plurality of wavelength bands Δλ. More specifically, the spectral scanning device 108a has first and second objectives 144 and 146 to relay the Raman signal portions 116 outputted at the second ends 128b of the optical fibers 128 to the array of detectors 140. As depicted, between the first and second objectives 144 and 146 is provided a tunable filter assembly 148. As can be appreciated, the tunable filter assembly 148 is configured to let pass a first wavelength band Δλ1 while filtering out the other wavelengths λ which allows the array of detectors 140 to generate image data indicative of the intensity I(X, Y) for the first wavelength band Δλ1. Then, the tunable filter assembly 148 can be tuned to let pass a second Δλ2 while filtering out the other wavelengths λ which allows the array of detectors 140 to generate image data indicative of the intensity I(X, Y) for the second wavelength band Δλ2, and so forth, until image data indicative of the intensity I(X, Y) for a plurality of wavelength bands Δλ are generated. In this example, the tunable filter assembly 140 is provided in the form of a liquid crystal tunable filter assembly. However, any other suitable tunable filter assembly can be used.

Figure 6:
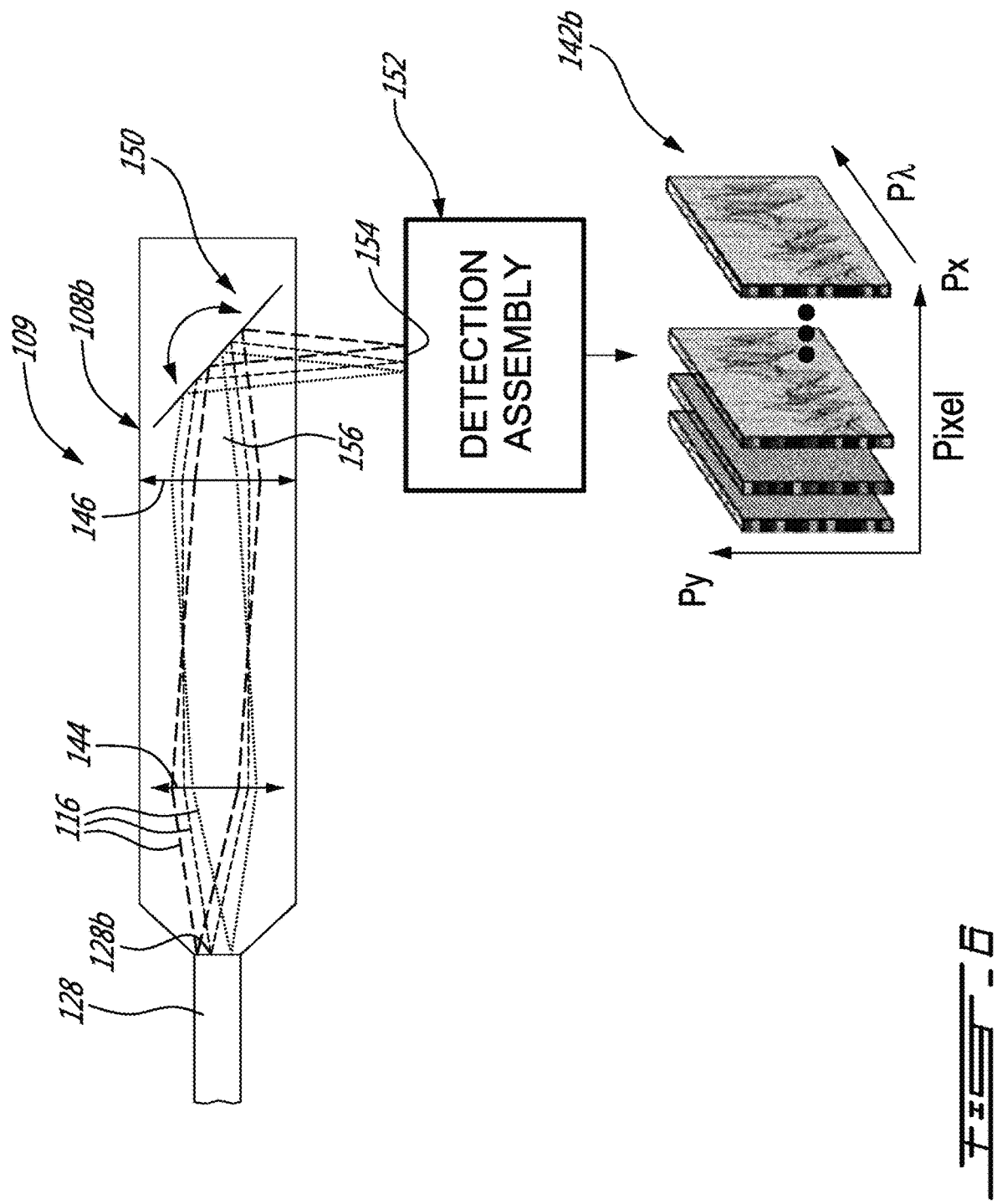
FIG. 6 is a schematic view of another example of a spatial scanning assembly of the system of FIG. 1, in accordance with an embodiment.

FIG. 6 shows an embodiment where the scanning device 108 is configured in the form of a spatial scanning device 108b to provide raw data which can be processed to provide images 142b indicative of the intensity I(Y, λ) for a plurality of regions ΔX. More specifically, the spatial scanning device 108b has a scanning mirror assembly 150 and an imaging spectrometer 152 having an entry slit 154 leading to the array of detectors inside the imaging spectrometer 152. As shown, the scanning mirror assembly 150 receives and directs at least some of the Raman signal portions 116 corresponding to a first region ΔX1 of the area of the sample, onto the entry slit 154, which allows the array of detectors to generate image indicative of the intensity I(Y, λ) for the first region ΔX1 of the area of the sample. Then, the scanning mirror assembly 150 is moved to direct some other of the Raman signal portions corresponding to a second region ΔX2 of the area of the sample, onto the entry slit 154, which allows the array of detectors to generate image data of the intensity I(Y ,λ) for the first region ΔX1 of the area of the sample, and so forth, until image data indicate of the intensity I(Y, λ) for a plurality of regions ΔX are generated.

As depicted, in this specific example, first and second objectives 144 and 146 are provided prior to the scanning mirror assembly 150 to receive the Raman signal portions 116 outputted at the second ends 128b of the optical fibers 128 and to provide a focussed beam 156 to the scanning mirror assembly 150. For the reasons mentioned above, such a configuration of the spatial scanning assembly 108b is convenient, as it avoids optical losses and also reduce undesirable effects due to vignetting.

Figure 7:
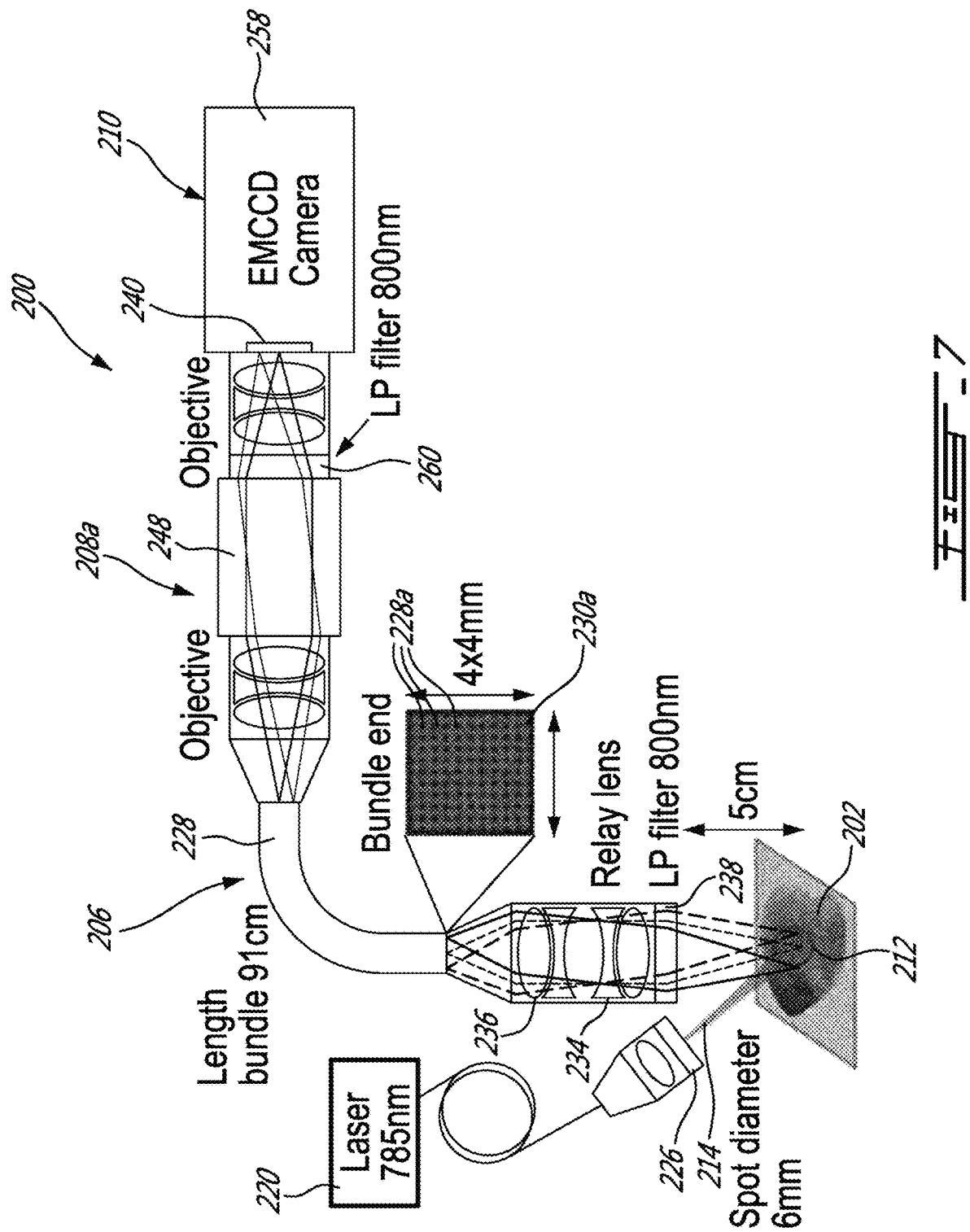
FIG. 7 is an schematic view of another example of a system for imaging a sample using Raman spectroscopy, shown with a spectral scanning assembly and an EMCCD camera.

Example 1—Wide-Field Spontaneous Raman Spectroscopy Imaging System for Biological Tissue Interrogation As can be appreciated, Raman spectroscopy has shown great promise as a method to discriminate between cancerous and normal tissue/cells for a range of oncology applications using microscopy and tissue interrogation instruments such as handheld probes and needles. Referring now to FIG. 7, another example of a system 200 for imaging a sample 202 using Raman spectroscopy is presented. The following presents the development of such a handheld collection assembly 206, demonstrating its capabilities to discriminate between different biological tissue types during ex vivo porcine experiments. The design of the system 200 can image a field of view of 25 $mm^2$ with a spatial resolution <100 μm and an average spectral resolution of 95 $cm^{-1}$, covering the fingerprint region between 450 and 1750 $cm^{-1}$. The ability of the system 200 to produce tissue maps of intensities I(X, Y, λ) based on molecular characteristics is demonstrated using a neural network machine learning technique.

For interventional procedures requiring the resection of cancer tissue, patient outcome (survival, quality of life) can be improved by maximizing the volume of cancer resected. Thus, there is a critical need in surgical oncology for portable and accurate tissue characterization tools that can see cancer beyond what can currently be detected with standard-of-care medical imaging techniques (e.g., magnetic resonance imaging, computed tomography, nuclear medicine) and minimize the unnecessary removal of healthy tissue to reduce debilitating effects. Optical techniques exploiting the contrast associated with light tissue interactions are ideal for intraoperative use because of the non-ionizing nature of the interactions, and they can potentially provide high-resolution spectroscopic information to detect the signature of a multitude of molecular species. Several approaches have been developed to guide surgeries following the injection of contrast agents targeting molecular processes associated with specific biomarkers. In vivo methods include fluorescence induced by the injection of aminolevulenic acid (ALA), indocynanine green (ICG), and fluorescein, but there is a wide range of ongoing research developing targeted fluorescent markers. Another option for surgical guidance is exploiting intrinsic optical contrast of tissue for in vivo intraoperative characterization, avoiding the need to administer an exogenous compound and, thus, significantly facilitating clinical translation. Such techniques have been developed for interventional use, including optical coherence tomography to image the attenuation contrast associated with elastic scattering, label-free tissue fluorescence to image intrinsic tissue fluorophores, diffuse reflectance to image the optical contrast associated with tissue chromophores (e.g., haemoglobin, melanin, lipids, water) and elastic scattering, as well as vibrational techniques interrogating tissue based on its fine molecular constituents based on inelastic light scattering.

Human tissue is composed of a multitude of molecular species with vibrational properties that can be probed using spontaneous Raman spectroscopy (RS). This example technique is thus used for label-free tissue characterization based on molecular fingerprinting in terms of tissue constituents, including lipids, proteins and amino acids, cholesterol, and DNA. Because the concentrations of these biomolecules, as well as their interactions with the cellular/extra-cellular environment, are known to vary between tissue types and pathological status, RS is a promising approach for eventual routine use as an adjunct guidance tool during surgical oncology interventions. Over the past two decades, Raman micro-spectroscopy has been used to detect cancer tissue with high accuracy with ex vivo tissue samples and cell cultures for several pathologies. However, only a limited number of studies have been conducted evaluating RS in vivo for surgical guidance applications. One of the impediments to the clinical translation of RS for interventional medicine applications includes the difficulty to acquire sufficiently high signal-to-noise ratio (SNR) inelastic scattering within timeframes compatible with the workflow of surgeons. Raman signals are associated with inelastically scattered light following tissue excitation with a monochromatic laser. Because of the rarity of Raman scattering photons, in vivo applications have mostly focused on the development of instruments collecting signals for a limited number of points using small footprint optical probes and needles. One objective of the system 200 is to move beyond current capabilities associated with single-point detection by using a macroscopic wide-field RS instrument for rapid cancer detection over fields of view as large as several millimeters across with a satisfactory spatial resolution of ~100 μm. These length scales are selected because they are consistent with state-of-the-art surgical microscopes and tissue dissection techniques for many applications, including neurosurgery.

This following example is provided in the form a proof-of-principle study that a practical wide-field RS imaging system can be designed using a flexible coherent imaging bundle to image the principal vibrational tissue characteristics associated with proteins and lipids. Only a limited number of wide-field imaging systems have been designed for in vivo tissue interrogation with RS. Stimulated Raman spectroscopy was demonstrated in vivo for rat brain imaging. However, there remain several challenges before practical optical fiber-based nonlinear signal detection can be used in an operating room.

Figure 8:
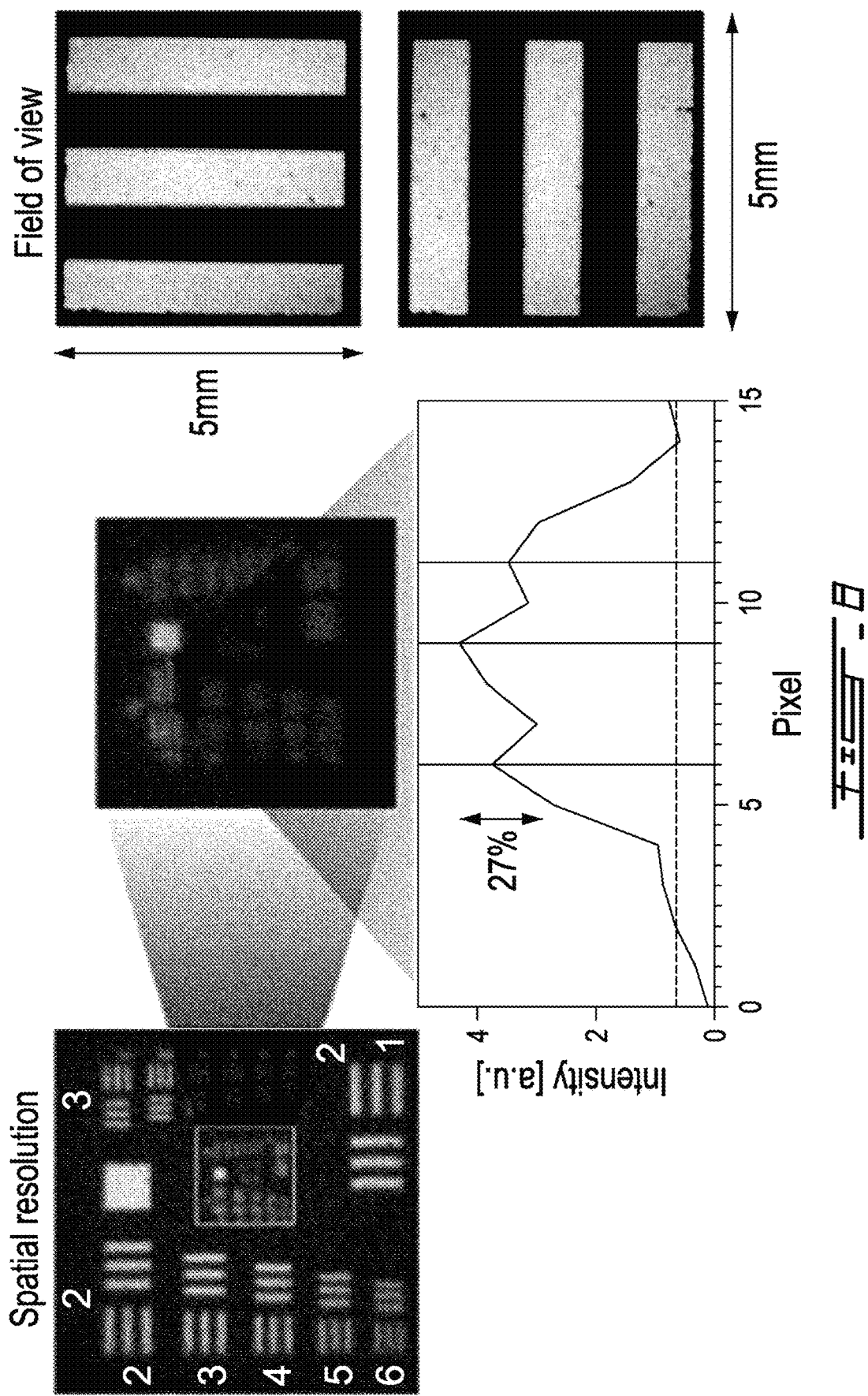
FIG. 8 includes graphs showing measurements made with a standard 1951 USAF resolution target to evaluation a field of view and a spatial resolution of the system of FIG. 7.

The system 200 of FIG. 7 is composed of a tissue interrogating collection assembly 206 comprising a bundle of optical fibers 228 provided in the form of a 91 cm length flexible coherent imaging fiber optics bundle (Schott, Germany), a spectral scanning assembly 208 a and a detection assembly 210 having an hyperspectral array of detectors 240. Tissue illumination is achieved using a 785 nm wavelength-stabilized monochromatic laser 220 (Innovative Photonic Solutions, New Jersey, USA). The excitation beam 214 is collimated before passing through a 785±3 nm line filter 226 (Semrock, New York, USA) with subsequent beam expansion, resulting in a circular illumination area 212 of 6 mm diameter in the imaging plane. The proximal end of the collection assembly 206 consists of first and second objective 234 and 236 in front of which a long-pass filter 238 [>800 nm, optical density (OD)>5] has been placed to block Rayleigh scattering. In this specific embodiment, the second objective 236 is a collimating lens. The first and second objectives 234 and 236 were chosen to ensure that the imaging plane is projected onto the two-dimensional array 230a of the first ends 228a of the optical fibers 228, which is composed of a square array of 400×400 fibers of 10 μm diameter and has a numerical aperture of 0.6. In this example, the first objective 234 has a numerical aperture of 0.2. Light detection is done across a liquid crystal tunable filter assembly 248 (Varispec SNIR LCTF, 650-1100 nm, 7 nm bandwidth) allowing spectral bands to be sequentially selected and imaged with the array of detectors 240 of a high-speed EMCCD camera 258 (Hnu, Nuvu; 512×512 pixels, 45% quantum efficiency at 850 nm. Another >800 nm long-pass filter 260 is placed in the optical path after the liquid crystal tunable filter assembly 248 to eliminate residual Rayleigh scattering. As depicted, objectives are disposed on each side of the liquid crystal tunable filter assembly 248 to ensure that light passing through it is collimated. A full dataset consists of images sequentially acquired for wavelengths between 814 nm and 910 nm, resulting in one Raman spectrum for each EMCCD pixel. The Raman spectral resolution is limited by the 7 nm bandwidth (95 cm$^{-1}$) of the liquid crystal tunable filter assembly 248, resulting in wavenumbers ranging from 453 to 1749 cm-1 covering most of the fingerprint region. The field of view (FOV) and the spatial resolution of the system 200 were evaluated using a standard 1951 USAF resolution target. As shown in FIG. 8, the system 200 produces images over a FOV of 25 mm$^2$ with 55.7 μm spatial resolution. The FOV was determined by imaging the line pairs separated by 2 mm, and the spatial resolution was measured using the Rayleigh criterion.

To evaluate the potential of the wide-field system 200 to distinguish different tissue types, measurements were made on a porcine meat sample, specifically along the longissimus dorsi muscle. A sample of approximately 1 cm thickness was purchased from a grocer and kept frozen overnight at 20° C. Measurements were made at an ambient temperature, ensuring that the FOV includes two tissue types (muscle and adipose tissue) separated by a visually detectable frontier (see the photograph 262 of FIG. 9). Each measurement was performed using an integration time of 500 ms per spectral band Δλ, resulting in a total imaging time (laser on)<90 s. During each imaging session, the monochromatic laser 220 was operated at 500 mW and turned off for 150 ms between bands. A dark noise dataset was acquired which consists of a measurement made with the same integration time as for the tissue, but with the laser turned off. Moreover, the instrument response function (IRF) of the system 200 was measured using a 785 nm Raman standard (NIST, Maryland, USA; model SRM 2241) for which the luminescence spectrum is known a priori. The measurement on the standard material was done using the same laser power and integration time as for tissue imaging.

Figure 9:
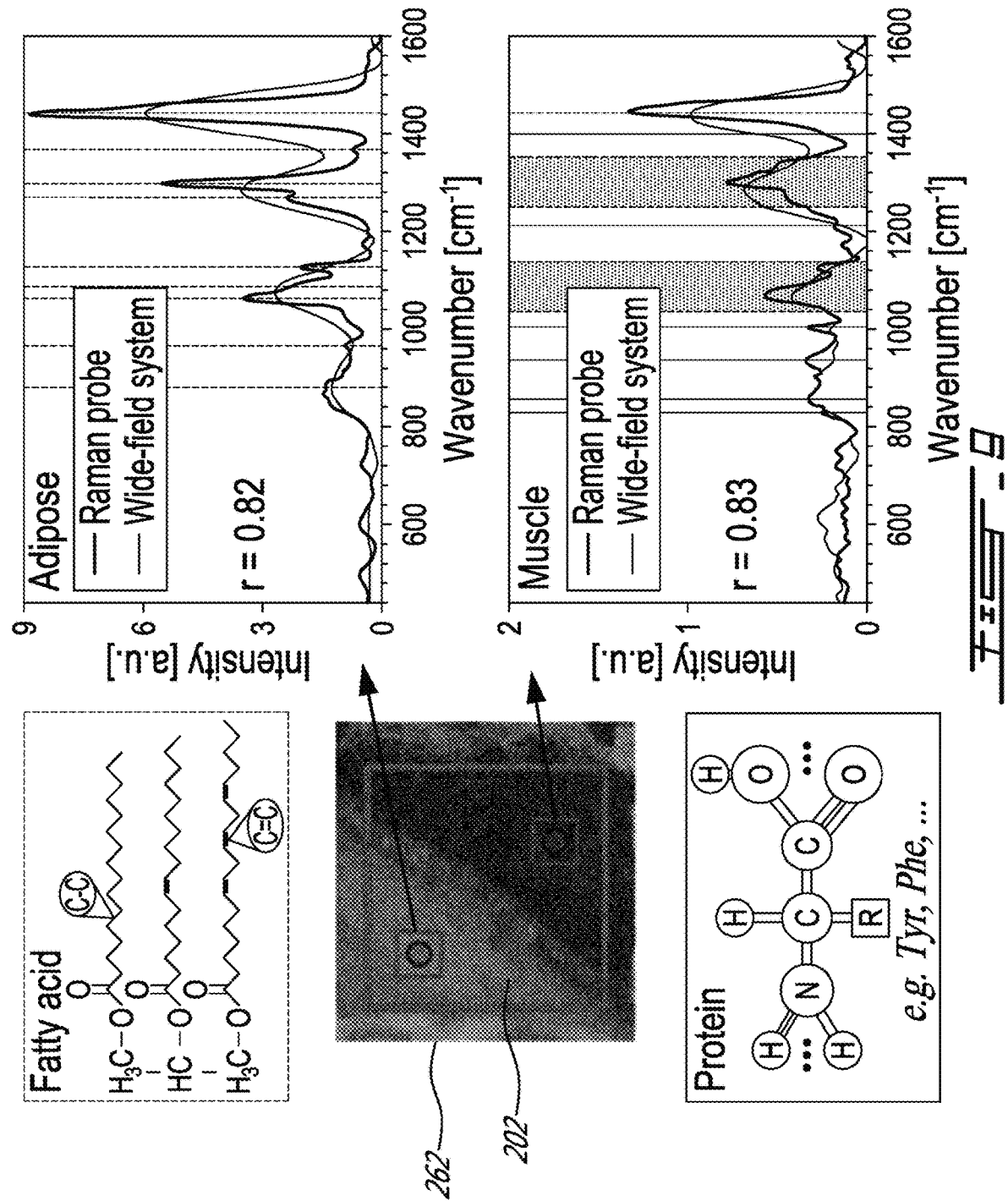
FIG. 9 includes graphs showing a comparison of the measurements made with a conventional single-point optical probe and the system of FIG. 7.

Post-processing was applied to the raw hyperspectral tissue data using a custom Matlab (MathWorks, Massachusetts, USA) program to isolate the signal component associated with inelastic scattering. A dark noise measurement was initially subtracted from the tissue imaging dataset followed by a pixel-per-pixel division by the Raman response of the system 200 retrieved from the NIST standard material to remove the IRF and to correct for the nonuniform illumination of the sample 202. An iterative smoothing function based on a polynomial fit algorithm was then applied to the spectra to evaluate and subtract the contribution from the background associated with stray light accepted inside the spectrometer, spectral bands widening and potentially autofluorescence generated by some biological tissue, and a Savitzky-Golay filter was applied to maximize the removal of non-Raman spectral artifacts. Finally, 4 by 4 spatial binning was applied to maximize the SNR. To verify that the reconstructed spectroscopic features are associated with the expected vibrational tissue characteristics (e.g., amide bands, aromatic amino acid peaks, proteins, and lipid bands), the measurements were made using an established single-point Raman spectroscopy system. Single-point measurements were made corresponding to a 0.2 mm$^2$ area using a 0.2 s total integration time and 60 mW of laser power. FIG. 9 shows that single-point probe measurements (circles) were compared with a spectrum averaged over multiple EMCCD pixels in regions of interest (small squares) located within the FOV of the wide-field system (larger square). The raw spectroscopic data collected with the single-point probe were post-processed using a similar procedure as described for the wide-field data.

Figure 10:
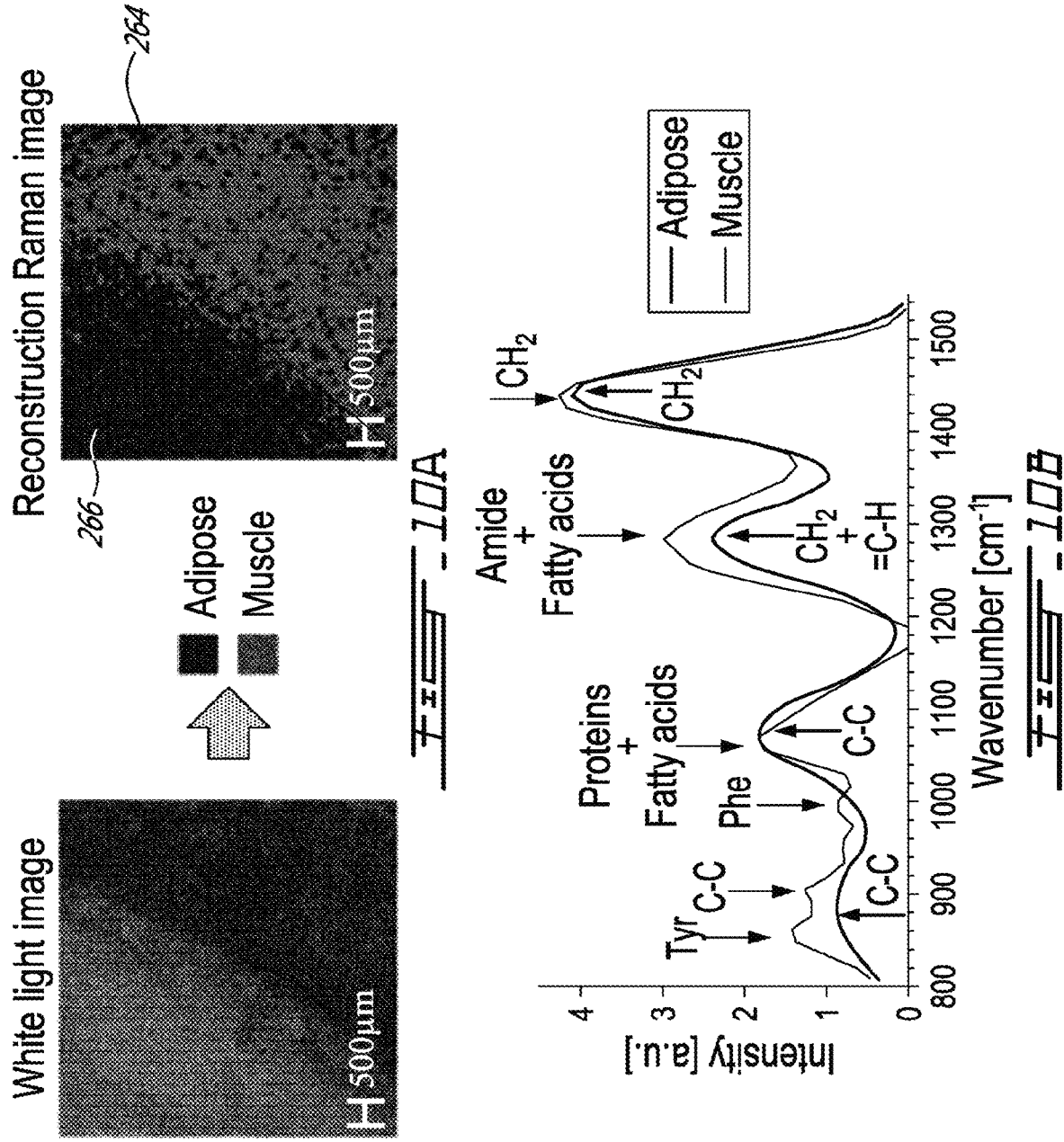
FIG. 10A includes a left hand side image showing a white light photograph of an region of a sample imaged with the system of FIG. 7 and a right hand side image is a false color rendering of the classification result between adipose tissue and muscle tissue.
FIG. 10B is a graph showing normalized spectra acquired with the system of FIG. 7 for adipose tissue and muscle tissue.

Spectra were compared (single-point probe versus the system 200) for porcine meat measurements in areas associated with muscle and adipose tissue. Single-point probe measurements made on adipose tissue show the distinguishing spectral features associated with the fatty acids represented as dotted vertical lines in FIG. 9. The dominant band at 1438 cm$^{-1}$ is the scissor deformation of $CH_2$, while the peak associated with the umbrella deformation of $CH_3$ is seen around 1368 cm$^{-1}$. Other peaks associated with in-phase twisting of $CH_2$ and symmetric rock cis isomer of =C—H can be observed around 1300 and 1270 cm$^{-1}$, respectively. The region from 1000 to 1200 cm$^{-1}$ presents three peaks at 1063, 1087, and 1127 cm$^{-1}$, which are associated with C—C aliphatic stretches. Bands around 967 and 880 cm$^{-1}$ are associated with an out-of-phase bend cis isomer of =C—H and C—C stretches. The measurements made on muscle tissue differ from those made on adipose tissue, principally due to higher protein content with relatively fewer lipids. The proteins yield spectral features associated with the backbone of the polypeptide chain (amide bands), the peaks associated with the structure of aromatic amino acids, as well as band characteristics similar to those observed for fatty acids. For example, the large peak between 1220 and 1380 cm$^{-1}$ can be associated with lipids, but also with the amide III band that is usually situated between 1225 and 1305 cm$^{-1}$. The peaks in the region from 1000 to 1200 cm$^{-1}$ can be associated with a C—C or N stretch of proteins, but also with the presence of lipids. The peaks at 830 and 855 cm-1 are associated with tyrosine (Tyr) and the peak at 1004 cm$^{-1}$ is that of phenylalanine (Phe). Although a strong correlation is observed between single-point and wide-field measurements (r>0.8), the limited spectral resolution of the latter thwarts its ability to specifically resolve all spectral features detected with the single-point probe. For example, FIG. 10B shows that for adipose tissue the scissor deformation of $CH_2$ is resolved with the wide-field system, and a second peak is observed representing an average of the 1300 and 1270 cm$^{-1}$ bands. However, the band associated with the umbrella deformation at 1368 cm$^{-1}$ is lost due to its low intensity, but two peaks are observed representing averages over the three C—C aliphatic stretches and averages over the cis isomer of =C—H and C—C stretches. Similar conclusions can be reached for muscle tissue but, in this case, the wide-field system also detects a band at 850 cm$^{-1}$ associated with the Tyr peaks and a band around 1005 cm$^{-1}$ that is associated with Phe.

The ability of wide-field RS imaging system 200 to automatically distinguish tissue types and produce tissue-specific images was tested using a supervised machine learning technique. To recreate images based on the molecular contrast provided by inelastic scattering, the Matlab neural network classification algorithm was used with 20 hidden neurons. The training dataset consisted of 256 spectra taken over adipose and muscle tissue. To avoid bias, training data were acquired on a different day along the longissimus dorsi muscle associated with a different porcine tissue sample. The "tissue type" ground truth was assessed by visual inspection, and 70% of the 256 spectra were used randomly as training data, while the rest were utilized for testing and validation. All spectra were normalized to get a mean of zero and a unitary standard deviation (standard normal variate). This pre-processing was done to ensure classification is more heavily weighted toward spectral rather than intensity differences. The false color image 264 shown in FIG. 10A was reconstructed based on the classification result demonstrating that the Raman-based reconstruction reproduces features seen in the white light photograph of the sample. The frontier 266 between adipose and muscle tissue is characterized by a ~500 µm thick region composed of a mixture of the two tissue types. On the reconstructed images, this frontier 266 appears as a mixture of both types of tissues since pixels, including infiltrations of a certain tissue type, may be more difficult to classify correctly. The neural network analysis was restricted to the wavenumber region from 800 and 1550 cm$^{-1}$ since, as suggested by FIG. 10B, most of the tissue information captured by the wide-field system is within that range. The most notable differences between adipose and muscle tissue spectra are associated with the presence of aromatic amino acid peaks in the 800 to 1000 cm$^{-1}$ region. Other differences are associated with the two peaks in the region from 1000 to 1400 cm$^{-1}$. In adipose tissue, these peaks are only influenced by the fatty acid content while, in muscle tissue, there is also a contribution from proteins. The shape of the peak between 1400 and 1550 cm$^{-1}$ is similar for both adipose and muscle tissue, since it is determined by molecular characteristics similar in both tissue types. However, it was noted on the non-normalized spectra that the intensity of that peak is more prominent in adipose tissue, since it contains much more lipids than muscle tissue.

A proof-of-concept study was presented suggesting wide-field Raman spectroscopy macroscopic tissue imaging performed using the system 200 could be achieved under experimental conditions compatible with in vivo clinical translation for surgical oncology applications. Specifically, it was demonstrated that a frontier between different tissue types (muscle versus adipose tissue) can be detected within ~1 min with the system 200 and its practical non-contact handheld collection assembly having the flexible bundle of optical fibers 228. Although the FOV and spatial resolution of the wide-field system 200 are consistent with the intended use for guidance during microsurgical procedures, its usefulness in some selected surgical oncology treatments may be limited by a lack of sensitivity. For example, the computed root-mean-square difference of average single-point probe spectra for adipose versus muscle porcine tissue is 19.4%, whereas it is <4% for normal brain versus glioma. Important characteristics to consider when evaluating system requirements for specific oncology applications include evaluating a minimum per-band Raman SNR, as well as the spectral resolution required to detect tissue peaks important for tissue discrimination. Moreover, some clinical applications will require a larger dynamical range of detection since some tissue types generate high levels of intrinsic fluorescence. For example, the level of auto-fluorescence in prostate tissue can be up to four times larger than in the normal brain. Other characteristics of the system 200 that may depend on the targeted clinical application include FOV and spatial resolution. For instance, a larger FOV may be advantageous when only gross tumor detection is required, but may be inadequate for applications where cellular infiltrations need to be detected. Other factors to consider are imaging time and sensitivity. These parameters can be improved in the actual wide-field system by using a different photodetection strategy. For example, the liquid crystal tunable filter assembly 248 can transmit on average <30% of incoming light to an EMCCD with <45% quantum yield for wavelengths >785 nm.

Figure 11:
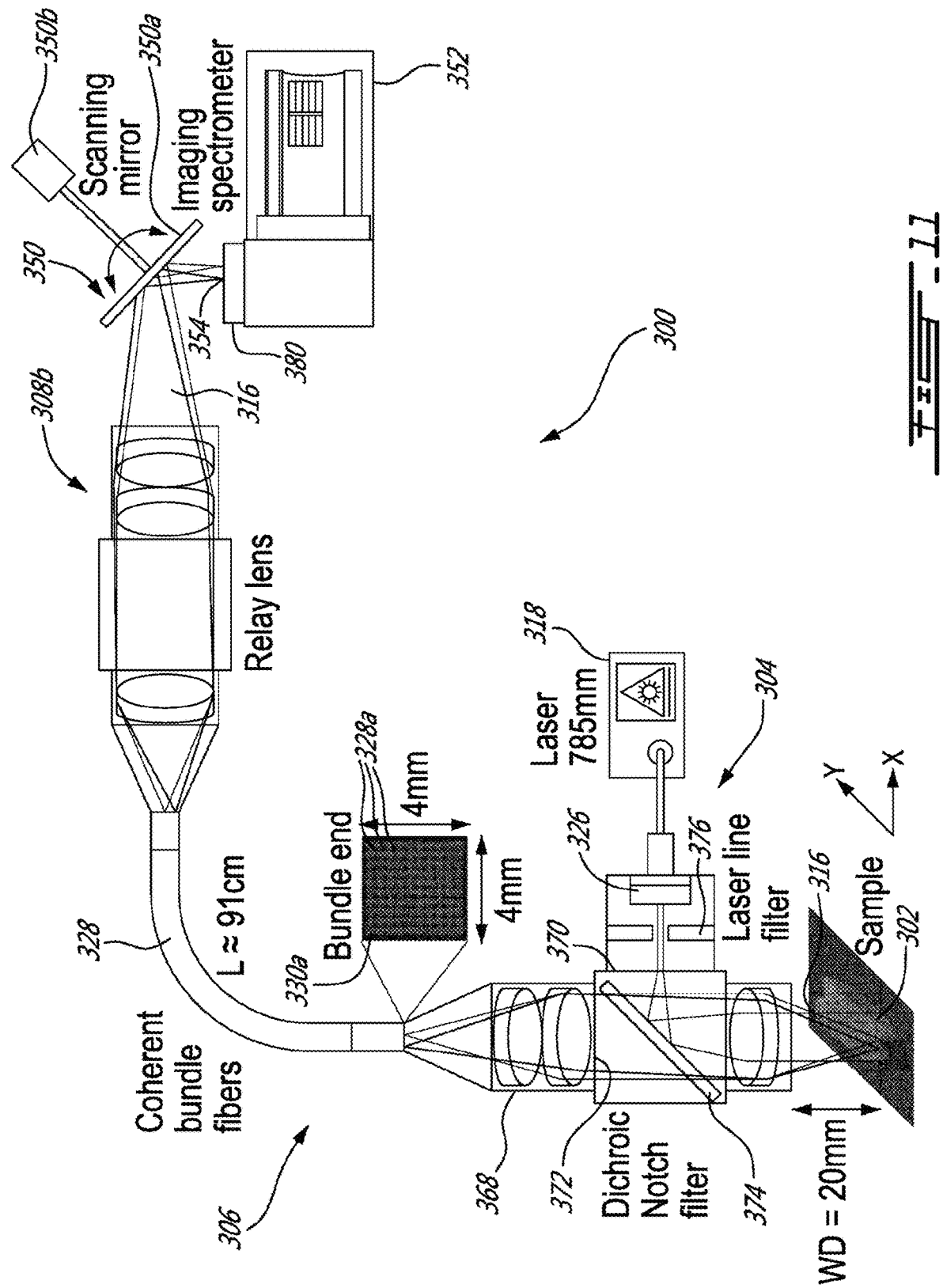
FIG. 11 is a schematic view of another example of a system for imaging a sample using Raman spectroscopy, shown with a spatial scanning assembly and an imaging spectrometer.

Example 2—Development and Characterization of a Handheld Hyperspectral Raman Imaging Probe System for Molecular Characterization of Tissue on Mesoscopic Scales FIG. 11 shows another example of a system 300 for imaging a sample 302 using Raman spectroscopy. As will be described, the system 300 has a collection assembly 306 is provided in the form of a non-contact 2 cm working distance handheld Raman imaging probe with a spatial resolution <125 µm and a spectral resolution of 6 cm$^{-1}$ over a field of view of 14 mm$^2$ and a spectral domain covering the whole biological tissue fingerprint region. A tissue imaging proof-of-principle is presented in the following paragraphs that is not specifically aimed at any particular oncology application, which may set the stage for the technique to be tested for surgical guidance in the scope of clinical studies during open surgery procedures such as in skin, breast and brain cancer.

Development steps are presented leading to a system achieving a spectral resolution and a light throughput suitable to detect the main Raman features associated with biological tissue. Our study details the principal characteristics of the system and discusses the data processing steps leading to the retrieval of calibrated hyperspectral Raman images in less than 100 s leaving further optimization to reduce imaging time for later work. An ex vivo proof-of-principle is presented using calf brain and swine tissue samples demonstrating molecular images can be created to distinguish tissue types based on Raman contrast. Validation of the system is achieved by comparing spectra from the new system with data obtained using a proven single-point Raman spectroscopy probe as the gold standard.

The Raman spectroscopy (RS) system 300 is composed of a module 368 comprising a collection assembly 306 and an excitation assembly 304. The module 368 includes a side port 370 for wide-field sample illumination and a back port 372 for hyperspectral signal detection. A monochromatic wavelength-stabilized laser 318 centered at 785 nm (Innovative Photonic Solution, New Jersey, USA) is controlled with analog tension and coupled to the illumination port. The laser 318 can deliver up to 1.5 W and is filtered using a 785±3 nm laser line filter 326 (Semrock, New York, USA) prior to being redirected toward the imaging optics of the system 300 using a dichroic notch filter 374 centered at 785 nm (Semrock, New York, USA) with optical density (OD) >5. A 6 mm diameter light field illuminates the sample 302 and the working distance (WD) of the detection optics is 20 mm. To maximize the homogeneity of the illumination field, an iris 376 is disposed along the illumination path with aperture opening adjusted to keep only light that is ~60% of the maximum intensity of the Gaussian output beam.

Backscattered light from the sample 302 is transmitted through the dichroic notch filter 374 responsible for rejecting the Rayleigh component (elastic scattering) of the signal. The bundle of optical fibers 328 has a 91 cm length and consists of a square array 330a of 400×400 fibers with 10 μm diameter each, a numerical aperture (NA) of 0.6 and an average light transmission of 45% (Schott, Germany). The spatial scanning assembly 308b projects complete images of the Raman signal portions 316 of the first ends 328a of the optical fibers 328 onto the entry slit 354 of the imaging spectrometer 352. The scanning mirror assembly 350 ensures full Raman spectroscopic images can be reconstructed by moving the projected images onto the entry slit 354 of the imaging spectrometer 352. The scanning mirror assembly 350 consists of a 25 mm circular aperture mirror 350a mounted onto a single axis galvanometer 350b (Model 6240H, Cambridge Technology, USA). A field of view (FOV) of 4.0 mm by 3.5 mm was measured along the scanning axis (X axis) and along the detector slit height (Y axis), respectively. The imaging spectrometer 352 (Emvision LLC, Florida, USA) has a 1:1 magnification and was custom-built to accommodate three interchangeable slits. Choosing slits with different widths allowed to find an optimal compromise between light throughout and spectral resolution. An annealed long-pass filter centered at 808 nm (Semrock, New York, USA) ensures rejection of any residual Rayleigh scattering light. Inelastically scattered light detection is achieved using a back illuminated CCD camera with a rectangular chip (Newton 920BR-DD, cooled down to −50° C., QE>90% at 850 nm). The array of detectors has 256×1024 pixels of 26 μm size and can detect up to 256 spectra associated with the image of a line on the sample 302. The optics of the system 300 was designed ensuring each line is projected along the shorter length (6.6 mm) of the chip through the length of the entry slit 354. The array of detectors can detect up to 1024 spectral features in the fingerprint RS region from 807 to 932 nm (355 to 2000 $cm^{-1}$). The imaging spectrometer 352 is limited to ~6 frames/second when operating at is the maximum read-out rate. A shutter 380 (model CH-61, EOPC, New York, USA) is placed at the entry slit 354 to eliminate smearing effect caused by the generation of undesired signals during the read-out process.

Data acquisition and hardware control was performed using a custom Labview software (National Instruments, USA) with the laser 318, the scanning mirror assembly 350, shutters such as shutter 380 and the imaging spectrometer 352 synchronized using a USB-6351 multifunction I/O device (National Instruments, Texas, USA). The software allows sequential data acquisition for hyperspectral lines on the tissue, then shifts the mirror 350a to the next position before another cycle of acquisition is initiated. The process continues until line scanning covering the entire pre-determined field of view is completed. The line images are then concatenated to create a hyperspectral map (as shown in FIG. 6). The software acquires 30,720 spectra per acquisition, over an area of 4.0×3.5 mm. Total acquisition time will vary depending on tissue properties (absorption, elastic scattering and fluorescence) and so should be optimized for each application. For example, a 100 s imaging time leads to a SNR (Maximum peak intensity divided by standard deviation of the noise) of ~9.75 on the $CH_2$ peak at 1438 $cm^{-1}$ for ex vivo porcine adipose tissue.

The width of the entry slit 354 of the imaging spectrometer 352 affects the spectral resolution and the amount of light collected, as well as the spatial resolution of each line imaged on the tissue surface. Here data analysis associated with three different slit widths (50, 75 and 100 μm) was considered to find the optimal compromise between spectral resolution, light throughput, and spatial resolution for tissue imaging. To this end a characterisation study of the system 300 was conducted evaluating the impact of slit width on each of those parameters. The three slit width values were selected based on theoretical computations insuring a spatial resolution <125 μm and a spectral resolution below 8 $cm^{-1}$ can in principle be achieved allowing to accurately resolve the principal Raman features associated with biological tissue.

The spectral resolution of the system 300 was evaluated using a sample of calcite which has a strong and narrow Raman peak centered at 1085 $cm^{-1}$. Calcite is commonly used as a standard to measure the spectral resolution of Raman systems with a standard accuracy of 20%. The sample was imaged with 400 ms integration time per spectral line using each of the three slit widths. The full width at half maximum (FWHM) of the calcite peak was evaluated for each spectrum acquired and used to compute the spectral resolution.

A standard USAF 1951 transmission resolution target was imaged using a tungsten lamp to evaluate the spatial resolution of the system. Images were registered with [60, 80, 100, 120, 140, 160 and 200] motor steps for each entry slit using a constant 100 ms integration time. All acquired images were averaged along the spectral axis before being normalized by the spatial illumination of the source measured from a uniform region on the target. To evaluate the spatial resolution, the contrast associated with each group element within the target was evaluated along both the X and Y axes by computing the ratio between the average normalized intensity of the reflective glass lines and the metallic spacing used as a reference. Spatial resolution was defined by the element with a minimal contrast value of 27% in accordance with the Rayleigh criterion.

Spectral acquisitions were made of a uniform polytetrafluoroethylene (PTFE) sample to assess the linear response of the system 300 in terms of signal and noise using the signal to background ratio (SBR) associated with specific Raman peaks as a surrogate. The PTFE has several peaks of different intensities over the spectral range of the system 300. The sample was imaged with different integration times and entry slits using a constant laser power of 950 mW. One representative spectrum was obtained from each Raman image by averaging five spectra across the field of view. For each representative spectrum, four peaks were selected for processing: 731 $cm^{-1}$, 1280 $cm^{-1}$, 1302 $cm^{-1}$ and 1380 $cm^{-1}$. The maximum intensity and the background values were computed and divided to obtain the SBR. Here the background is mainly associated with spectral widening of Raman spectral bands and stray light generated along the optical path by the elastic scattering accepted inside the spectrometer and projected as a continuous spectrum on the CCD sensor of the camera. Background is estimated for each peak as the average intensity from either side of each peak.

All spectra and images presented in this study were submitted to the same calibration and data preprocessing procedures: 1) spectral calibration, 2) dark count removal, 3) correction for the system's spectral and spatial responses, and 4) background subtraction. Those data processing steps are now briefly described. Equation 1 models the raw signal acquired for each spatial position $x_i$, $y_i$ and wavenumber $v_i$ (i=1, 2, . . . , N, where N is the total number of pixels) where t is the integration time and I the intensity of the excitation light.

$$I_{raw}(x_i, y_i, v, I, t) = E_{xy}(x_i, y_i) \times E_v(x_i, y_i, v_i) \times [R(x_i, y_i, v, I, t) + B(x_i, y_i, v, I, t) + D(x_i, y_i, v, I, t)] \quad (1)$$

The measured Raman signal is labeled $R(x_i, y_i, v, I, t)$, and other non-Raman quantities affecting the signal include the spatial and spectral instrument response function $E_{xy}(x_i, y_i)$ and $E_v(x_i, y_i, v_i)$ background signal associated with potential ambient light sources $D(x_i, y_i, v, I, t)$, intrinsic tissue fluorescence background and residual Rayleigh scattering bleed-through $B(x_i, y_i, v, I, t)$ and various sources of stochastic noise (e.g., shot noise and read-out noise). A Matlab (MathWorks, USA) program was custom-made to isolate the Raman-specific component from the raw signal for each pixel $x_i$, $y_i$:

$$R(v, I, t) = \frac{I_{raw}(v, I, t) - \tilde{D}(v, t)}{E_{xy} E_v(v)} - B(v, I, t) \quad (2)$$

The first correction step allowed for spectral calibration on the array of detectors of the imaging spectrometer 352. The calibration associating all 1024 pixels to their Raman shift axis must be done independently for each of the 256 spectral lines to correct the smile aberration that causes translation of up to 0.7 nm (9.4 cm$^{-1}$) between spectral features at the bottom of the sensor and at the middle of the array of detectors. The calibration was performed using acetaminophen since it exhibits several strong spectral features over the spectral domain of the system. This data was used to determine the Raman shift axis for each pixel position. Spectral content was limited and calibrated from 940 to 1800 cm$^{-1}$. Following this procedure, all pixels of the Raman image were expressed on a common spectral base and post treatment in Eq. (2) was applied for each pixel of the hyperspectral image.

The second step of the calibration procedure required a measurement without any laser excitation at the beginning of every set of measurements to estimate the raw dark count $\tilde{D}(v, I, t)$ and subtract it. Since light sources in the room were constant throughout the experiments, only one dark count measurement was needed for all subsequent measurements performed with the same integration time. The third step addressed the system efficiency, both spatially (laser illumination profile across the field of view), and spectrally (spectral response of all optical components). Spatial efficiency $E_{xy}$ was calculated using the intensity map of the 1302 cm$^{-1}$ Raman peak of Teflon obtained from a uniform sample. The intensity map was normalized to unity and pixels below a third of the maximal value were associated with dead pixels in the image. The instrument's spectral response function $E_v$ was also measured in this step using a 785 nm Raman standard (Model SRM2241, National Institute for Standards and Technology (NIST), USA) which generates a fully characterized luminescence spectrum $R_T(v)$. Ten measurements were performed on the Raman standard to minimize the contribution from the noise and spectral response $E_v(v)$ was isolated in each pixel by dividing the measure by $R_T(v)$.

The fourth and final calibration step addressed mainly the background removal.

The background spectrum includes stray light accepted inside the spectrometer, spectral bands widening and potentially autofluorescence generated by some biological tissue. Here, a similar method to iterative polynomial regression was used, and consisted of a smooth curve estimation using the smooth function of Matlab through a large window. The size of the window was chosen so that it was at least 3 times larger than the typical larger of one Raman peak resulting in 90 spectral features. For each iteration, spectral features above the given threshold (1% of the spectrum standard deviation) compare to smooth curve fit were replaced by the smooth curve for the next iteration until no spectral features above the threshold remained. Noise filtering was also applied at the end of the post treatment on $R(v, I, t)$ using a Savitsky-Golay filter (windows: 15, fit: $2^{nd}$ order).

To further characterize imaging performances of the imaging system, experiments were conducted imaging ex vivo animal specimens namely calf brain and tissue along the longissimus dorsi muscle of a swine. Samples were purchased from the grocer, cut in slices of approximately 1 cm thick and frozen overnight between two flat surfaces to surface targeted for imaging is a flat as possible. Measurements were performed the next day at an ambient temperature of 20° C. over tissue regions containing two tissue types of interest: gray and white matter for calf brain, fat and muscle tissue on swine meat sample. For calf brain acquisitions, integration time was fixed at 900 ms per spectral line for a total acquisition time of 123 s when adding the read-out time and the shutter transfer time of the camera. The laser power was set at 950 mW over an area of 28 mm$^2$, which represent an intensity of 33.9 mW/mm$^2$. The same power was used over the sample of swine tissue, but the integration time per spectral line was reduced to 700 ms for a total acquisition time of 100 s. Each hyperspectral image can then be post-processed.

An initial experiment was planned in order to benchmark the wide-field probe (WFP) against measurements from an established single-point probe (SPP). For SPP measurements, integration time was fixed at 150 ms per point and averaged over 3 different acquisitions for a total of 450 ms. The contact SPP illuminated an area of 0.2 mm$^2$ with a laser power of 50 mW, which represents an intensity of 250 mW/mm$^2$. To quantify the similarity between the spectra acquired with both systems, the Pearson correlation factor (R) was calculated on the overlapping spectral region from 950 cm$^{-1}$ to 1650 cm$^{-1}$.

TABLE 1

Main Raman peaks found in calf brain and porcine tissue along with the main vibrational bonds and organic molecules at the origin of the optical contrast.

| Raman shift (cm$^{-1}$) | Main source of molecular contrast | Organic molecules |
|---|---|---|
| 970 | =C—H out-of-plane bend cis | Lipid |
| 1002 | Phenylalanine breathing mode (insensitive to biochemical environment) | Protein |
| 1064 | C—C Aliphatic out-of-phase stretch | Lipid |
| 1085 | C—C Aliphatic stretch | Lipid |

TABLE 1-continued

Main Raman peaks found in calf brain and porcine tissue along with the main vibrational bonds and organic molecules at the origin of the optical contrast.

| Raman shift (cm$^{-1}$) | Main source of molecular contrast | Organic molecules |
|---|---|---|
| 1125 | C—C aliphatic in-phase stretch, C—N stretch in protein | Lipid & protein |
| 1265 | =C—H symmetric rock cis or amide III band | Lipid & protein |
| 1296 | >CH$_2$ twisting (all in phase) | Lipid |
| 1339 | CH$_2$/CH$_3$ wagging, twisting &bending of lipids, nucleic acids | Lipid & nucleic acid |
| 1368 | CH$_3$ Symmetric deformation (umbrella) | Lipid |
| 1438 | >CH$_2$ Symmetric deformation (scissor) | Lipid |
| 1458 | CH$_3$ Antisymmetric deformation | Lipid |
| 1558 | Tyrosine | Protein |
| 1608 | Tyrosine, Phenylalanine ring vibration | Protein |
| 1640 | Amide I band | Protein |
| 1655 | C=C stretch, Amide I band | Lipid & Protein |

A second experiment was designed to assess the ability of the WFP to detect known Raman tissue signatures in brain and swine meat. Table 1 presents the principal Raman shifts associated with both of those tissues as well as the main sources of vibrational contrast.

A third experiment was designed to test whether or not Raman images obtained with the WFP can be used to recreate tissue maps with molecular specificity at mesoscopic scales. To this end, images were formed based on the contrast associated with ratios between peaks whose intensity changes between tissue types. Peaks, spectral widths and spectral regions were carefully chosen to maximize molecular information and to insure strong Raman signal-to-noise ratios inuring highest quality images. The first ratio was obtained by dividing the lipid peak at 1438 cm$^{-1}$ (scissor deformation of CH$_2$) with the integral over a spectral region (1605 to 1640 cm$^{-1}$) capturing peaks associated with several proteins including tyrosine, phenylalanine and amide I band. The molecular interpretation of this ratio is that it correlates with the concentration of lipids. A second ratio was computed by dividing the lipid and protein peak at 1265 cm$^{-1}$ with a pure lipid peak at 1296 cm$^{-1}$. The molecular interpretation of this ratio is that it correlates with the concentration of proteins. Both ratios were computed for each pixel and encoded in different colormaps for visual representation. Each colormap channel was normalized to its minimal and maximal values.

Figure 12A:
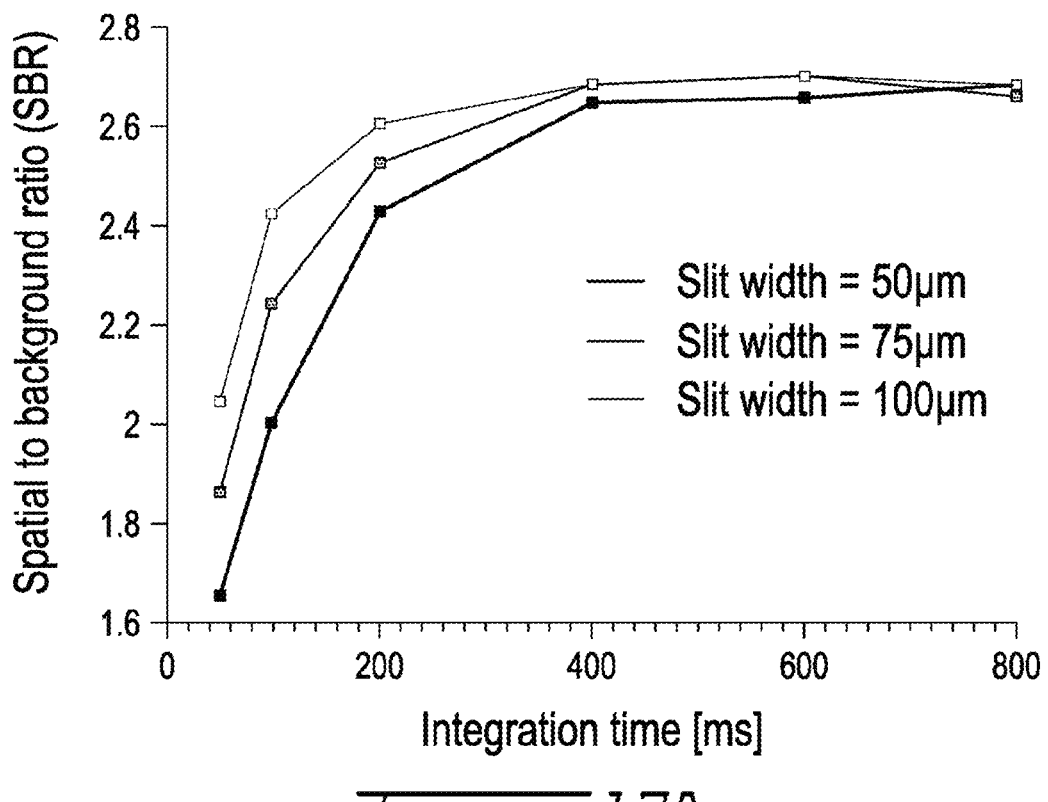
FIG. 12A is a graph showing a signal to background ratio (SBR) as a function of the integration time for three different widths of an entry slit of the imaging spectrometer of FIG. 11.
Figure 12B:
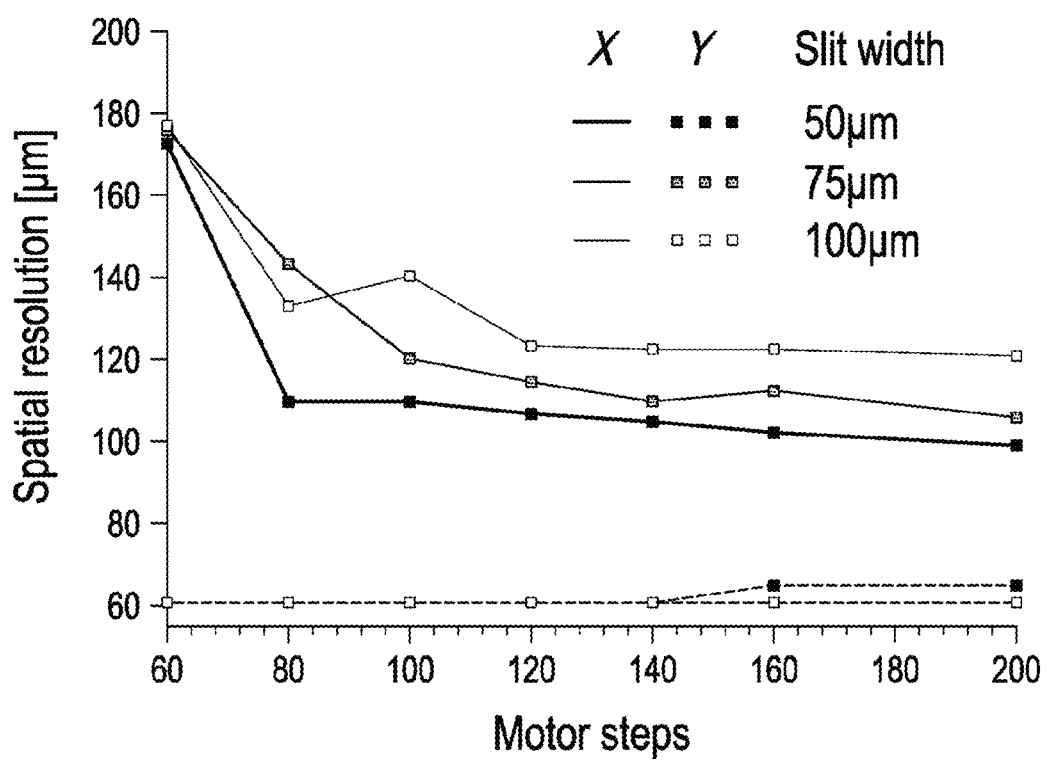
FIG. 12B is a graph showing a spatial resolution as a function of the number of motor steps along the X and Y axes of the image.

Table 2 and FIG. 12A-B present a system performance evaluation in terms of spectral resolution, spatial resolution and signal-to-background ratio (SBR) to be used as a basis to select the optimal slit width, number of motor steps and integration time per line for tissue imaging. The spectral resolution of the system was measured using calcite for each of the three slit widths and the measured spectral resolutions reported in Table 2. The theoretical values associated with each measurement are also listed and were computed using a spectrometer bandpass formula. Measured resolutions were always larger compared with the theoretical values by >25% because experimental peak detection always includes at least a minimum of three pixels. Based on this evaluation, a slit width of 75 µm and less lead to a spectral resolution <8 cm$^{-1}$ and would allow principal tissue Raman peaks to be imaged.

TABLE 2

Experimental and theoretical resolution of the Raman imaging system for different spectrometer slit widths.

| Slit width (µm) | $\delta\omega_{exp}$[cm$^{-1}$] | $\delta\omega_{theo}$[cm$^{-1}$] |
|---|---|---|
| 50 | 4.75 | 3.25 |
| 75 | 5.97 | 4.88 |
| 100 | 8.14 | 6.51 |

SBR analyses are only presented for the Teflon (PTFE) peak at 1302 cm$^{-1}$ since it leads to the same conclusions as the other peaks that were considered. The SBR as a function of integration time for different slit widths is shown in FIG. 12A. For low integration time, SBR presents a clear advantage for larger slits because of the increased light throughput and improved signal to noise ratio (SNR) associated with the inelastic scattering part of the signal. For sufficiently large integration time, Raman signal is less affected by the noise and both the Raman and background components of the raw signal are increasing linearly with integration time causing the SBR to asymptotically converge to a maximum value. For Teflon, this critical time to reach the plateau is around 400 ms but it will differ for different materials and will be longer in biological tissue because of the presence of larger backgrounds since more important autofluorescence signal may add up to the background. For larger slits, the spectral content of each peak will spread out over more pixels (degradation of spectral resolution, see below) and the total intensity per pixel will decrease. The background intensity is not affected by the spectral resolution since it is continuous over the spectral range and therefore larger slits may not give optimal SBR for large Raman SNR as shown by all the slit reaching the same asymptotic value. However, since the signal of biological tissue is expected to be smaller than for Teflon the integration time required to reach the SBR plateau may be larger and therefore a larger slit should be privileged to optimize signal detection. Although the 100 µm slit width should be selected based on the SBR analysis, as shown above it doesn't fit the spectral resolution requirement for the system. Based on the SBR analysis and spectral resolution constraint, a slit width of 75 µm should be selected since it SBR value is larger than 50 µm yet very close to 100 µm for integration times above 400 ms. However, because of the expected smaller Raman signal in tissue, a minimum value of 700 ms is chosen moving forward with the tissue experiments.

FIG. 12B presents the spatial resolution of the system along the X and Y axes of the image for all three slit widths as a function of motor steps. The spatial resolution along the Y axis is limited by the constant value of 62 µm due to aberrations generated by optical components in the detection path. The spatial resolution along the X axis is mainly limited by the entry slit width and the number of motor steps. Fewer motor steps lead to a poorer spatial resolution and as the number of steps increases the spatial resolution sharpens until it reaches a slit width-limited maximal spatial resolution at about 120 motor steps for all slit widths. Although the optimal spatial resolution is associated with the 50 µm, the gain of <10 µm in spatial resolution compared with the 75 µm slit does not justify the loss in light throughput.

Based on the system characterisation results from Section 2, the specifications and acquisition parameters retained for tissue imaging are reported in Table 3. Briefly, the 75 µm slit width was used to insure a spectral resolution of approximately 6 cm$^{-1}$ because it is suitable for discerning most of the spectral components of biological tissue. The number of motor steps was fixed at 120 since very few improvements were observed for larger motor steps. The resulting spatial resolution was 115 µm and 62 µm along the X and Y axes, respectively.

TABLE 3

Raman imaging system technical specifications selected for the ex vivo tissue experiments.

| | Specifications |
|---|---|
| Field of view | 3.5 × 4.0 mm |
| Working distance | 20 mm |
| Entry slit width | 75 µm |
| Number of motor step | 120 |
| Spatial resolution | Y-axis: 62 µm X-axis: 115 µm |
| Total number of voxel | 256 (Y-axis) × 120 (X-axis) × 1024 (spectral features) |
| Spectral resolution | ~6 cm$^{-1}$ (@ 1085 cm$^{-1}$) |
| Spectral Range | 940-1800 cm$^{-1}$ |
| Registration time | 16 s (read out and shutter transfer time) |
| Integration time | 700-900 ms per spectral line (100-123 s in total) |

FIGS. 13A-F show white light images and representative Raman spectra for calf brain and porcine tissue. SPP acquisitions are identified with a circle whereas the WFP sub-regions with which it was compared (121 pixels averaged to one spectrum) are identified by a rectangle. FIGS. 13A and 13D show white light structural images of the calf brain and swine meat sample, respectively. FIGS. 13B and 13C show Raman spectra acquired with the SPP and WFP for gray matter and white matter, respectively. FIGS. 13E and 13F show the same information for adipose and muscular tissue in porcine tissue, respectively. The Pearson correlation factors were R=0.87 and 0.85 for gray matter and muscle. Fat and white matter spectra showed higher correlation factors with R>0.97.

Figure 14A:
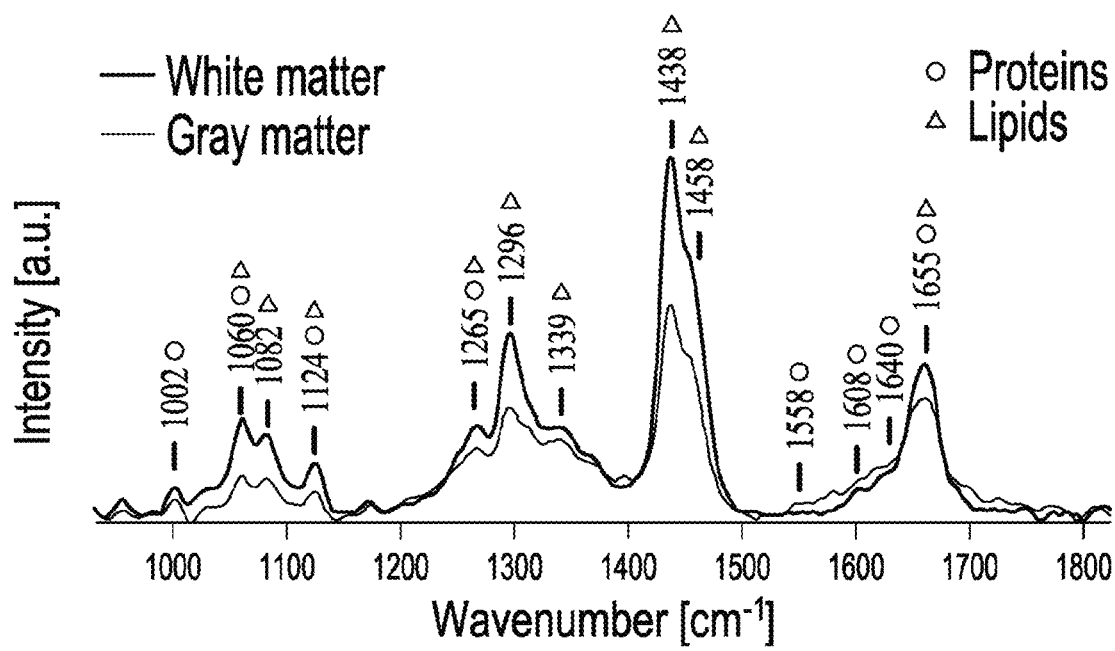
FIG. 14A is a graph showing Raman spectra acquired, ex vivo, with the system of FIG. 11 on gray matter and white matter of a calf brain sample.
Figure 14B:
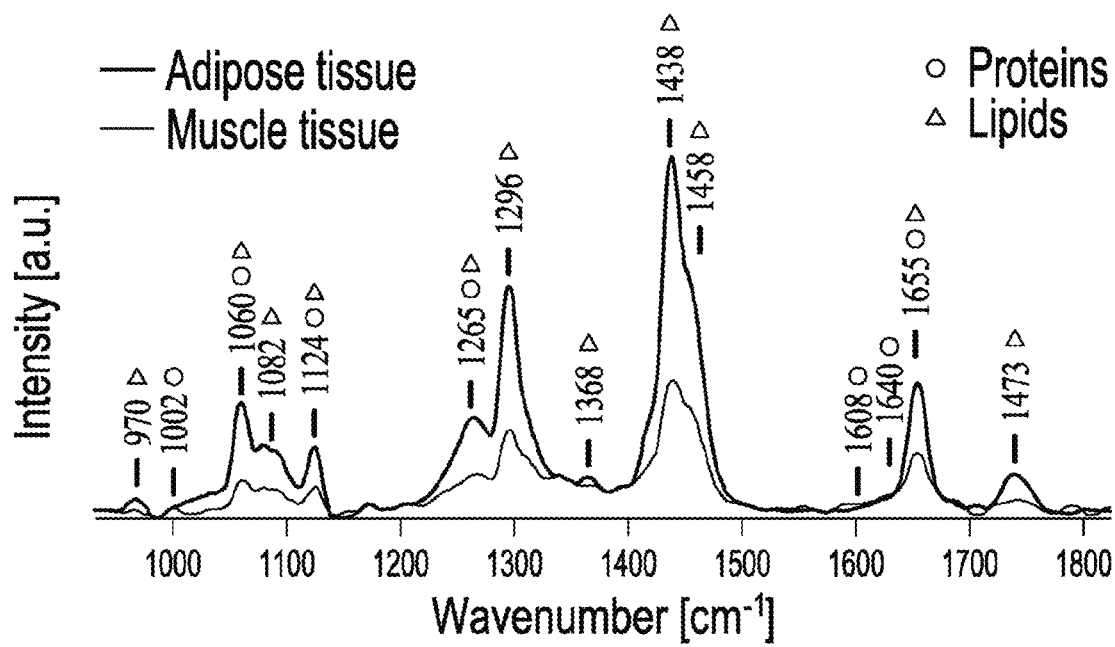
FIG. 14B is a graph showing Raman spectra acquired, ex vivo, with the system of FIG. 11 on adipose tissue and muscle tissue of a porcine meat sample.

FIGS. 14A and 14B present a comparison between WFP spectra of different tissue types in calf brain and porcine tissue. The main tissue peaks were labeled with containing mostly protein and/or lipids according to the molecular vibrations listed in Table 1. As previously reported, white matter presents a higher content in saturated lipids which resulted into an increase of the peaks at 1065, 1296 and 1438 cm$^{-1}$. Gray matter, on the other hand, presented a larger concentration of protein which resulted in a shaper peak at 1002 cm$^{-1}$ associated with phenylalanine and higher peak intensities at 1608, 1620 and 1640 cm$^{-1}$. Similar behaviour can be observed on swine tissue where muscle is shown to present several spectral features associated with high protein content, while adipose tissue presented a larger concentrations of fatty acid. Since muscle tissue also contains fatty acids, the protein peaks close to the lipid peaks might have been overwhelmed by the contribution of lipid signal from those tissues. As shown, the main tissue peaks are identified according to whether they are mostly associated to proteins (circles) or lipids (triangles).

The capability of the system 300 to recreate molecular image was validated by forming images based on contrast associated with peak ratios predominantly representing either lipid or protein content. FIGS. 15A and 15C present the imaging results for the calf brain specimen, while FIGS. 15B and 15D show the corresponding swine tissue results. In those images the color map represents the protein-rich ratio (labeled as protein in FIG. 15C) represents lipid-rich content (labeled as lipid in FIG. 15C). As was expected, both the gray matter and the muscular tissue show a high protein content, while white matter and adipose tissue show a higher concentration of lipids. The frontier between different types of tissue is depicted with a dash line overlay on both the white light and reconstructed images.

In this study, a mesoscopic wide-field Raman imaging probe was developed using an imaging bundle of fibers. This work represents the first attempt toward the development of a practical Raman imaging handheld probe with a mesoscopic field of view of view of 3.5×4.0 mm and respective spatial resolutions of 62 µm and 115 µm along Y and X axis and spectral resolution of 6 cm$^{-1}$. Ex vivo animal specimens were successfully imaged to generate maps of Raman spectra. The implementation of this system compared well with state-of-the-art single-point RS probes. It also allowed for visualization of Raman shifts as predicted in the literature.

To preliminarily demonstrate the ability of the system 300 to detect margins between different tissue types, molecular maps of calf brain and swine tissue were generated based on ratio of protein and lipid contents showing clear delineations between white and gray matter as well as between muscle and adipose tissue. In the literature, other groups have used the ratio between lipid and protein Raman peak to discriminate between cancerous and normal tissue. As a result, the approach used here could potentially be used in the future to discriminate between cancerous and normal tissue based on spectral features associated with protein and lipid content. However, even if the reconstructed images in FIGS. 15C and 15D show a dominant green and blue color over their respective tissues type, there is a 500 µm region around the edge of both tissues that is not well defined. Since the illumination covers the entire field of view for each spectral line acquisition, detection in each point may have been affected by spatially offset Raman scattering leading to migration of photons generated deeper in the tissue up to a point on the surface spatially offset from the illumination. Signal generated by the illumination over the fat tissue may diffuse up to reach the surface of muscle tissue leading to a blurry edge between the two tissues. This problem could be corrected along one axis of the image using line scanning illumination, but this would require the addition of a scanning illumination system inside the probe. Other factors as the tilt and roughness of the surface sample may also explain the blurry edge.

Minor differences in the spectra from both probes (FIGS. 13B-C and 13E-F) can be observed especially between 1000 and 1200 cm$^{-1}$ for white matter where a single peak is observed with the SPP while two peaks are resolved with the WFP. The wide field system has a spectral resolution of 6 cm$^{-1}$ which is more than twice that of the SPP which allowed the resolution of more peaks. Another source of variations between measured spectra may arise from the background estimation that slightly differs between the two systems since neither of it covered the same spectral range. Both estimated very similar background spectrum inside their own spectral region, however a more important error was noticed when spectral range border was overlapping with a peak. For example, muscle tissue has important peaks between 800 and 1100 cm$^{-1}$ leading to a difficulty in estimating the background in this region for WFP measurement—for which the spectral range begin at 940 cm$^{-1}$—resulting in a lower correlation in this specific region. Even if the shape is not perfectly correlated in this region, similar peak can be identified with both probe. A similar error can be observed at the upper edge of the spectral limit of the SPP measurements around 1600 cm$^{-1}$. The correlation also decrease for gray matter and muscle tissue since the SNR of those tissue is lower.

Single point probes are considered as the state-of-the-art technology for Raman spectroscopy in oncology since they have shown the ability to discriminate cancerous tissue in vivo with accuracy higher than 85%. To translate any other technology into a surgical guidance tool, one should aim at SNRs equivalent to SPP. The SPP used in this study illuminated a sample surface of 0.5 mm diameter and converted all of that signal into one spectrum. With the WFP, signal collected from the illuminated area is divided by the number of pixels that compose the image. Therefore, the signal available for the mesoscopic system was divided by approximately 400 compared to the single-point Raman probe. Calculated SNR for the strong peak of $CH_2$ at 1438 $cm^{-1}$ reach value of ~40 on white matter using the SPP while the same SNR calculated for the WFP drop to ~7. Under the current acquisition parameters, integration time for the WFP is 18 times higher while the illumination intensity is ~7.5 times higher for the SPP. Considering those numbers, the collection efficiency of the WFP was higher than the SPP, however, since the signal was divided in a larger number of pixels, SNR was lower for WFP. Before bringing the system for clinical RS acquisition, collection efficiency still needs to be improved. Part of this optimisation could be achieved using custom made optic instead of off-the-shelf lenses to improve signal throughput. The custom design could also include a zero power optical windows in front of the first lens to bring the probe in contact with the tissue. During measurements, the tissue would be gently pressed on the front window of the probe to maintain the perfect focal distance for the object during the measurement.

In addition to the development of Raman imaging probes for intra-operative cancer surgery guidance, the approach used here has great potential to improve minimally invasive procedure performs with an endoscope or surgical robots. Both of those technologies are currently using imaging bundle to recreate white light images of the tissue from which the surgeon guided himself through the tissue. However, white light image suffers from poor contrast and pathological tissues are not always depicted clearly to the surgeon which can increase the time of analysis and the discomfort of the patient. This demonstrates that under a few modifications, such a Raman imaging system could be added to currently used endoscopes using the imaging bundle channel to perform the detection. Surgical robots can offer a better precision; however, they don't offer the palpation sensation of the tissue to the surgeon which may lead to lack of sensitivity compared to standard surgery. The addition of an imagery modality as Raman spectroscopy could improve the sensitivity and overcome this lack.

Turning now back to FIG. 2, an example of a system using a bundle of optical fibers in illumination is schematized. The system includes a laser 10, and illumination optics 12. The illuminating optics 12 can include pattern generating optics and filters for instance. A bundle of optical fiber 28 then leads to the sample 14 via an assembly including a collimating lens 16, a dichroic notch filter 18 and a focus lens 20. The Raman signal is collected via the focus lens 20, the dichroic notch filter 18, and collection optics/sensors 26. In FIG. 3, the system has both a bundle of optical fibers used in collection and in illumination, the collection subsystem can be as illustrated as FIG. 1 for instance.

Such arrangements can be useful for performing spatially offset Raman Spectroscopy Imaging, for instance. Spatially offset Raman Spectroscopy Imaging can allow to obtain information in a depth orientation in the sample, in addition to information on the surface of the sample. Indeed, referring to FIG. 16A, when a sample having a given translucidity is exposed to laser illumination 30 on a given portion of its surface, the illumination 30 penetrates into the sample. The penetrating illumination can be deviated to a certain extent which can depend on the optical properties of the sample and/or the shape of the impinging beam. Accordingly, if the portion of the sample surface which directly receives the illumination is imaged, Raman signal stemming from various depths can be detected. However, if a portion of the sample which is spatially offset from the portion of the sample which is illuminated is imaged (e.g. 32), some of the Raman signal stemming from certain depths will not be present, and we can detect Raman signal emitted from a specific depth range. The extent of the depth range will depend on the distance between the imaging window on the surface and the illumination window on the surface. FIGS. 16B and 16C illustrate the progressively fading Raman signal intensity as the distance from the illumination window increases. The limit of depth from which Raman signal intensity can be detected can vary depending on the characteristics of the illumination and the characteristics of the sample, for instance.

FIG. 17A illustrates a first example of offset Raman Spectroscopy Imaging which can be performed with a system such as shown in FIG. 2 or FIG. 3. In this image, an illuminated area is illustrated by a full bar, whereas an imaging window is illustrated by a dashed line bar. The imaging window can be applied to a non-illuminated area adjacent the illuminated area to detect Raman signal coming from below the surface of the sample (e.g. sample tissue). The imaging window can be swept away from the illuminated area to detect Raman signal coming from deeper and deeper from below the surface, to a certain extent. This technique can be referred to as spatially offset Raman spectroscopy, for instance. The process can be repeated in more than one direction.

FIG. 17B schematizes that a similar effect can be achieved by imaging a larger, fixed, imaging window (shown in dashed lines), and by sweeping the illuminated area across the imaging window. This can be achieved with a sufficiently wide field of imaging, for instance. Sweeping the illuminated area across the imaging window can be performed by the pattern generating optics, upstream of the bundle of optical fiber, for instance, and accordingly, when the illumination area is sweeped, the illumination intensity distribution is varied across the array of optical fibers. This technique can be referred to as wide field multi spectral spatially offset Raman spectroscopy imaging, for instance.

FIGS. 18A and 18B are similar to FIGS. 17A and 17B except that they use a circular area of illumination instead of a line. As shown in FIG. 18B, the radius of the circular area of illumination can be varied during imaging, which can also achieve a depth scan of the surrounding area. Indeed, as the spot size is increased, the area immediately adjacent the spot size will generate lower depth Raman signal than when it was further away from the periphery of the spot.

FIGS. 19A and 19B are similar to FIGS. 18A and 18B except that they use an annular area of illumination instead of a circular spot. The scanning can be achieved by varying either the thickness or the radius, or both, of the annular area. An imaging window can be used around, or within, the annular area for depth scanning for instance. This can allow to achieve point inverse spatially offset Raman spectroscopy, inverse spatially offset Raman spectroscopy imaging, point multi-spectral inverse spatially offset Raman spectroscopy or multi spectral inverse spatially offset Raman spectroscopy imaging, for instance.

Moreover, as shown in FIGS. 20A and 20B a fixed pattern having a regularly, spatially repeating sequence of illuminated areas and non-illuminated areas can be used to achieve spatial frequency domain Raman imaging (FIG. 20A) or multi spectral spatial frequency domain Raman imaging (FIG. 20B), for instance. The pattern can be unidimensional, or bidimensional, for instance. By using such a repeating sequence, and by varying the spatial frequency of such a repeating sequence over time, depth information about the Raman signal can become available.

Various other shapes, sizes, configurations, positions and sequences of illuminated areas and non-illuminated areas can be used in alternate embodiments.

It will be understood by persons having ordinary skill in the art that the intensity of the illuminated areas can vary to a certain extent across the illuminated area. For instance, the intensity can vary between 60 or 70% of the maximum intensity and the maximum intensity. The intensity of the non-illuminated areas will typically have a sharp contrast with the intensity of the illuminated areas. The intensity of the non-illuminated areas can be below 20%, below 10%, or even lower, than the maximum intensity or than the average intensity in the illuminated areas. In other embodiments, the intensity can vary progressively (e.g. sinusoidally) between the illuminated areas and the non-illuminated areas, in which case it may be convenient to consider the non illuminated areas as the areas having less than 50% of the maximum intensity.

It was found that a significant amount of illumination intensity could be conveyed across the bundle of optical fibers while maintaining the integrity of the pattern of illumination. Testing demonstrated that 12 kW/cm2 could be continously conveyed via a bundle of optical fibers in an arrangement such as presented above. It is believed that more power could be conveyed, even though the practical limit of conveyed power for a bundle of optical fibers may be lower than the practical limit of conveyed power for a single fiber, given that a single fiber may be more effectively cooled than a bundle of optical fibers, for instance. Accordingly, it is believed that in Raman imaging applications, it can be desired to provide between 100 W/cm2 and 250 kW/cm2 of illumination power density to the first end of the optical fiber bundle, for instance. In certain cases, it may be preferred to limit the illumination power density to 100 kW/cm2 by caution, and in cases where optical fiber bundles are used both in illumination and collection, it can be preferred to use an illumination power density of at least 1 kW/cm2. In time-sensitive applications, it may be preferred to use an illumination of over 100 W/cm2 to limit integration time, perhaps more in the case of pulsed illumination, and illuminating at a greater power can be preferred to reach higher integration speeds, within the extent of limits associated to the specific application.

As can be understood, the examples described above and illustrated are intended to be exemplary only. For instance, the term "assembly" is used in a broadly manner so as to encompass embodiments having one or a plurality of elements. As it can be understood, the two two-dimensional arrays can be N×M arrays, where N and M are positive integers greater than one. Although the methods and systems described above have been described in the context of multispectral Raman spectroscopy, it is envisaged that the methods and systems described herein can be adapted to perform monochromatic Raman spectroscopy. In this case, the scanning assembly could be provided in the form of a redirecting assembly comprising objectives and at least one notch filter filtering all wavelength except a selected wavelength band. In this way, the spectral scanning assembly or the spatial scanning assembly could be avoided, to the benefit of the redirecting assembly, and image data representative of the intensity of the Raman signal as function of the spatial coordinates for the selected wavelength band could be generated. Alternately, it is envisaged also that the methods and systems described herein can be adapted to, instead of performing Raman spectroscopy, perform diffuse reflectance spectroscopy. In this case, fluorescence imaging could be performed by splitting the signal portions outputted from the second end of the optical fibers using a dichroic filter, for instance. In this specific embodiment, the illumination assembly includes more than one excitation sources and the detection assembly includes more than one detector or more than one array of detectors. The scope is indicated by the appended claims.

What is claimed is:

1. A method for imaging a sample using Raman spectroscopy, the method comprising:
    illuminating an area of said sample with an excitation beam, spatial coordinates of said area emitting, in response to said illuminating, corresponding Raman signal portions each having corresponding spectral components;
    collecting said Raman signal portions using first ends of a plurality of optical fibers extending between said first ends and second ends, said first ends and said second ends of said plurality of optical fibers being arranged in a respective one of two two-dimensional arrays, said two two-dimensional arrays maintaining relative positions of said plurality of optical fibers to one another from said first ends to said second ends in a manner that said collected Raman signal portions are propagated along the plurality of optical fibers while maintaining said relative positions from said first ends towards said second ends, from which said Raman signal portions are outputted;
    receiving and directing at least some of said Raman signal portions signal outputted from said second ends of said plurality of optical fibers onto an array of detectors; and
    said array of detectors generating image data indicative of an intensity of said Raman signal portions as function of said spatial coordinates of said area and as function of said spectral components of said Raman signal portions;
    wherein said collecting said Raman signal portions is performed using an objective having a numerical aperture below 0.4 which is optically coupled to said first ends of said plurality of optical fibers, providing a field of view of said area of said sample exceeding 1 mm$^2$.

2. The method of claim 1 wherein said two-dimensional array of said first ends of said plurality of optical fibers have a height and a width both exceeding 1 mm, providing a field of view of said area of said sample exceeding 1 mm$^2$.

3. The method of claim 1 wherein said receiving and directing is performed using a tunable filter assembly optically coupled to said second ends of said plurality of optical fibers and leading to said array of detectors, said tunable filter assembly receiving said Raman signal portions and filtering out at least some spectral components therefrom, and repeating said receiving and said filtering out for remaining ones of said spectral components of said Raman signal portions.

4. The method of claim 1 wherein said receiving and imaging is performed using a scanning mirror assembly and an imaging spectrometer having an entry slit leading to said array of detectors, said scanning mirror assembly receiving and directing at least some of said Raman signal portions corresponding to a region of said spatial coordinates of said area of said sample, onto said entry slit, and repeating said receiving and said directing for remaining ones of said Raman signal portions, corresponding to remaining regions of said spatial coordinates of said area of said sample.

5. The method of claim 4 further comprising an objective assembly receiving said Raman signal portions from said second ends of said plurality of optical fibers and providing a focussed beam including said at least some of said Raman signal portions to said scanning mirror assembly, which directs at least some of said focussed beam of said Raman signal portions onto said entry slit.

6. A system for imaging a sample using Raman spectroscopy, the system comprising:
an excitation assembly configured to illuminate an area of said sample with an excitation beam, spatial coordinates of said area emitting, in response to said illumination, corresponding Raman signal portions each having corresponding spectral components;
a collection assembly comprising a plurality of optical fibers extending between first ends and second ends, said first ends and said second ends of said plurality of optical fibers being arranged in a respective one of two two-dimensional arrays, said first ends being positionable to collect said Raman signal portions from said area of said sample, said two two-dimensional arrays maintaining relative positions of said plurality of optical fibers to one another from said first ends to said second ends in a manner that said collected Raman signal portions are propagated along the plurality of optical fibers while maintaining said relative positions from said first ends towards said second ends, from which said Raman signal portions are outputted;
a scanning assembly configured to receive and image at least some of said Raman signal portions signal outputted from said second ends of said plurality of optical fibers onto a focal plane; and
an array of detectors at the focal plane positioned to receive said Raman signal portions from said scanning assembly and to generate image data indicative of an intensity of said Raman signal portions as function of said spatial coordinates of said area and as function of said spectral components of said Raman signal portions.

7. The system of claim 6 wherein said collection assembly comprises an objective having a numerical aperture below 0.4, the objective being optically coupled to said first ends of said plurality of optical fibers, providing a field of view of said area of said sample exceeding 1 mm$^2$.

8. The system of claim 6 wherein said two-dimensional array of said first ends of said plurality of optical fibers have a height and a width both exceeding 1 mm, providing a field of view of said area of said sample exceeding 1 mm$^2$.

9. A method for imaging a sample using Raman spectroscopy, the method comprising:
illuminating an area of said sample with an excitation beam, spatial coordinates of said area emitting, in response to said illuminating, corresponding Raman signal portions each having corresponding spectral components;
collecting said Raman signal portions using first ends of a plurality of optical fibers extending between said first ends and second ends, said first ends and said second ends of said plurality of optical fibers being arranged in a respective one of two two-dimensional arrays, said collected Raman signal portions propagating along said plurality of optical fibers from said first ends towards said second ends, from which said Raman signal portions are outputted;
receiving said outputted Raman signal portions and focussing said received Raman signal portions to form a focussed beam including at least some of said Raman signal portions;
receiving said focussed beam and directing a portion of said focussed beam towards an entry slit of an imaging spectrometer, said entry slit leading to an array of detector, said portion of said focussed beam including Raman signal portions corresponding to a region of said spatial coordinates of said area of said sample;
said array of detectors generating image data indicative of an intensity of said Raman signal portions as function of said spatial coordinates of said region and as function of said spectral components of said Raman signal portions; and
repeating said receiving said focussed beam, said directing and said generating for remaining portions of said focussed beam, by moving said focussed beam relative to said entry slit, said remaining portions corresponding to remaining regions of said spatial coordinates of said area of said sample.

10. The method of claim 9 wherein said receiving said Raman signal portions is performed using an objective having a numerical aperture below 0.4 which is optically coupled to said first ends of said plurality of optical fibers, providing a field of view of said area of said sample exceeding 1 mm$^2$.

11. The method of claim 9 wherein said two-dimensional array of said first ends of said plurality of optical fibers have a height and a width both exceeding 1 mm, providing a field of view of said area of said sample exceeding 1 mm$^2$.

12. The method of claim 9 wherein said two two-dimensional arrays of said first ends and second ends of said plurality of optical fibers maintaining relative positions of said plurality of optical fibers to one another from said first ends to said second ends.

* * * * *